United States Patent
Shiraki

(10) Patent No.: US 10,735,326 B2
(45) Date of Patent: Aug. 4, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/035,847

(22) Filed: Jul. 16, 2018

(65) Prior Publication Data

US 2019/0068502 A1    Feb. 28, 2019

(30) Foreign Application Priority Data

Aug. 31, 2017    (JP) ................................ 2017-166949

(51) Int. Cl.
*H04L 12/801* (2013.01)
*H04L 12/835* (2013.01)
(Continued)

(52) U.S. Cl.
CPC .............. *H04L 47/12* (2013.01); *H04L 47/11* (2013.01); *H04L 47/2483* (2013.01);
(Continued)

(58) Field of Classification Search
CPC ......... H04L 47/12; H04L 47/30; H04L 47/11; H04L 47/2483; H04L 47/29; H04L 47/50;
(Continued)

(56) References Cited

U.S. PATENT DOCUMENTS

| 8,451,727 | B2 * | 5/2013 | Tamura | H04L 47/10 370/231 |
| 8,923,115 | B2 * | 12/2014 | Pelletier | H04L 47/12 370/229 |

(Continued)

FOREIGN PATENT DOCUMENTS

| JP | 2006-319746 | 11/2006 |
| JP | 2011-015288 | 1/2011 |

OTHER PUBLICATIONS

K. Ramakrishnan, et al., "The Addition of Explicit Congestion Notification (ECN) to IP" (May 15, 2018), URL <http://www.icir.org/floyd/papers/rfc3168.txt>, pp. 1-45 (p. 45).

*Primary Examiner* — Man U Phan
(74) *Attorney, Agent, or Firm* — Fujitsu Patent Center

(57) ABSTRACT

An information processing apparatus configured to detect congestion caused by a plurality of flows passing through a network, the network including a plurality of switch devices, the information processing apparatus includes a memory, and a processor coupled to the memory and configured to receive first information from a first switch device included in the plurality of switch devices, the first information indicating that the congestion occurs in the first switch device, receive second information from a second switch device that is included in the plurality of switch devices and receives a packet from the first switch device, the second information indicating at least one flow included in the plurality of flows which pass through the first switch device, and based on the first information and the second information, identify, from the at least one flow which passes through the first switch device, a specific flow which causes the congestion.

15 Claims, 26 Drawing Sheets

(51) Int. Cl.
*H04L 12/863* (2013.01)
*H04L 12/851* (2013.01)

(52) U.S. Cl.
CPC .............. *H04L 47/29* (2013.01); *H04L 47/30* (2013.01); *H04L 47/50* (2013.01)

(58) Field of Classification Search
CPC ... H04L 12/801; H04L 12/835; H04L 12/851; H04L 12/863; H04L 47/10; H04L 47/19; H04L 47/31; H04L 12/24
USPC ........................................................ 370/326
See application file for complete search history.

(56) References Cited

U.S. PATENT DOCUMENTS

| | | | |
|---|---|---|---|
| 9,231,876 B2 * | 1/2016 | Mir ..................... H04L 43/0829 |
| 9,419,900 B2 * | 8/2016 | Anghel ................. H04L 47/115 |
| 9,948,561 B2 * | 4/2018 | VerSteeg ................ H04L 47/12 |
| 10,038,639 B2 * | 7/2018 | Francini ................ H04L 47/193 |
| 10,116,579 B2 * | 10/2018 | De Schepper .......... H04L 47/56 |
| 10,171,328 B2 * | 1/2019 | Bergamasco ......... H04L 47/263 |
| 10,397,825 B2 * | 8/2019 | Cui ....................... H04W 24/10 |
| 2008/0212575 A1 * | 9/2008 | Westberg .............. H04L 1/0014 |
| | | | 370/356 |
| 2009/0067335 A1 * | 3/2009 | Pelletier ................. H04L 47/10 |
| | | | 370/238 |
| 2011/0002224 A1 | 1/2011 | Tamura |
| 2016/0294698 A1 * | 10/2016 | Berberana Fernandez-Murias ..... |
| | | | H04L 47/12 |

\* cited by examiner

FIG. 3

| PORT NUMBER | STATUS |
|---|---|
| P1 | S1 |

| PORT NUMBER | STATUS | TIME |
|---|---|---|
| P1 | S1 | T1 |

| SWITCH ID | PORT NUMBER | STATUS | TIME |
|---|---|---|---|
| ID1 | P1 | S1 | T1 |

FIG. 5B

| DA | SA | ET | ToS | SIP | DIP | PROTOCOL | SP | DP |
|---|---|---|---|---|---|---|---|---|
| DA1 | SA1 | IPv4 | ECN=1 | SIP1 | DIP1 | TCP | SP1 | DP1 |

| DA | SA | ET | ToS | SIP | DIP | PROTOCOL | SP | DP | COUNT |
|---|---|---|---|---|---|---|---|---|---|
| DA1 | SA1 | IPv4 | ECN=1 | SIP1 | DIP1 | TCP | SP1 | DP1 | C1 |
| DA2 | SA2 | IPv4 | ECN=1 | SIP2 | DIP2 | TCP | SP2 | DP2 | C2 |
| DA3 | SA3 | IPv4 | ECN=1 | SIP3 | DIP3 | TCP | SP3 | DP3 | C3 |

| DA | SA | ET | ToS | SIP | DIP | PROTOCOL | SP | DP | COUNT |
|---|---|---|---|---|---|---|---|---|---|
| DA1 | SA1 | IPv4 | ECN=1 | SIP1 | DIP1 | TCP | SP1 | DP1 | C1 |
| DA2 | SA2 | IPv4 | ECN=1 | SIP2 | DIP2 | TCP | SP2 | DP2 | C2 |
| DA3 | SA3 | IPv4 | ECN=1 | SIP3 | DIP3 | TCP | SP3 | DP3 | C3 |

FIG. 5C

| DA | SA | ET | ToS | SIP | DIP | PROTOCOL | SP | DP |
|---|---|---|---|---|---|---|---|---|
| | | | | | MATCH | | | |
| DA1 | SA1 | IPv4 | - | SIP1 | DIP1 | TCP | SP1 | DP1 |
| DA2 | SA2 | IPv4 | - | SIP2 | DIP2 | TCP | SP2 | DP2 |
| DA3 | SA3 | IPv4 | - | SIP3 | DIP3 | TCP | SP3 | DP3 |

| DA | SA | ET | ToS | SIP | DIP | PROTOCOL | SP | DP | PACKET COUNT | BYTE COUNT (SIZE) |
|---|---|---|---|---|---|---|---|---|---|---|
| | | | | MATCH | | | | | COUNT INFORMATION | |
| DA1 | SA1 | IPv4 | - | SIP1 | DIP1 | TCP | SP1 | DP1 | P1 | S1 |
| DA2 | SA2 | IPv4 | - | SIP2 | DIP2 | TCP | SP2 | DP2 | P2 | S2 |
| DA3 | SA3 | IPv4 | - | SIP3 | DIP3 | TCP | SP3 | DP3 | P3 | S3 |

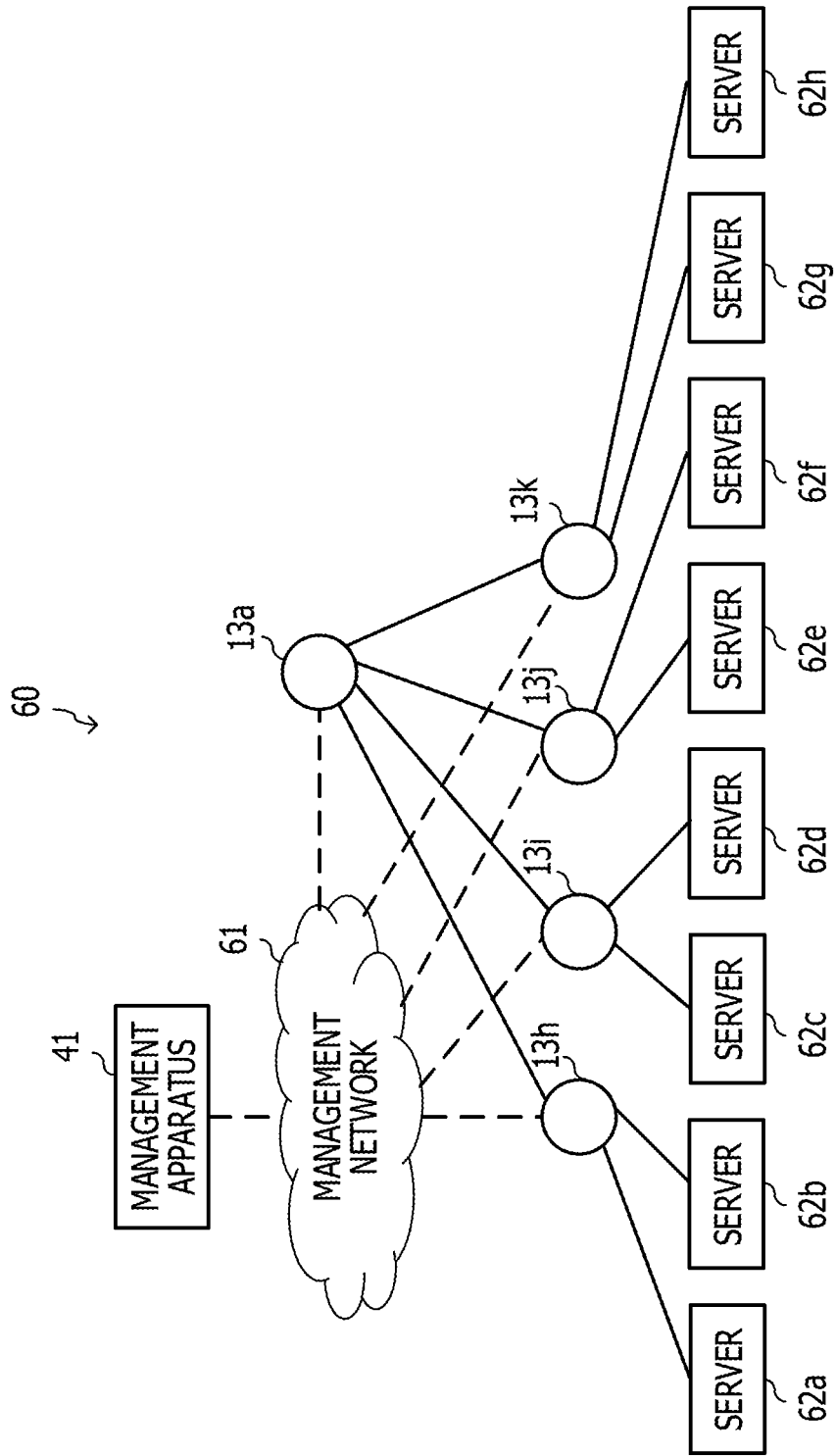

FIG. 15

| MATCH | | | | | | | | | ACTION | | | COUNT INFORMATION | |
|---|---|---|---|---|---|---|---|---|---|---|---|---|---|
| DA | SA | ET | ToS | SIP | DIP | PROTOCOL | SP | DP | MODIFICATION | TRANSFER | COPY | PACKET COUNT | BYTE COUNT (SIZE) |
| DA1 | SA1 | IPv4 | ※ | SIP1 | DIP1 | TCP | SP1 | DP1 | NO | NO | NO | P1 | S1 |
| DA2 | SA2 | IPv4 | ※ | SIP2 | DIP2 | TCP | SP2 | DP2 | NO | NO | NO | P2 | S2 |
| ※ | ※ | ※ | ECN=1 | ※ | ※ | ※ | ※ | ※ | NO | NO | YES | P3 | S3 |

| Port ID 1 | Port ID 2 |
|---|---|
| $PID_{11}$ | $PID_{21}$ |
| $PID_{12}$ | $PID_{31}$ |
| ⋮ | ⋮ |

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-166949, filed on Aug. 31, 2017, the entire contents of which are incorporated herein by reference.

FIELD

The embodiments discussed herein are related to an information processing apparatus, a method and a non-transitory computer-readable storage medium.

BACKGROUND

In recent years, cloud computing has promoted system aggregation, and thus stable operation of a network has become an important issue. To obtain a stable performance in the network, congestion, that is, traffic collision has to be addressed. Congestion control technology for addressing congestion is preexisting technology, and, for example, there is congestion control technology using an explicit congestion notification (ECN). Japanese Laid-open Patent Publication No. 2006-319746 is one of related art documents.

SUMMARY

According to an aspect of the invention, an information processing apparatus configured to detect congestion caused by a plurality of flows passing through a network, the network including a plurality of switch devices, the information processing apparatus includes a memory, and a processor coupled to the memory and configured to receive first information from a first switch device included in the plurality of switch devices, the first information indicating that the congestion occurs in the first switch device, receive second information from a second switch device that is included in the plurality of switch devices and receives a packet from the first switch device, the second information indicating at least one flow included in the plurality of flows which pass through the first switch device, and based on the first information and the second information, identify, from the at least one flow passes through the first switch device, a specific flow which causes the congestion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating the format of each of a queue-threshold passing notification, a congestion information table, and congestion-detection information in the embodiment;

FIG. 5B is a diagram illustrating the format of each of flow information, a flow information table, and congestion-flow information in the embodiment;

FIG. 5C is a diagram illustrating the format of each of specific-pattern count setting and count information in the embodiment;

FIG. 6 is a configuration diagram illustrating an example of the information processing system of an embodiment;

FIG. 15 is a diagram illustrating the configuration of a packet-collation process table in the embodiment;

DESCRIPTION OF EMBODIMENTS

Congestion control technology using an ECN or the like performs control against occurrence of congestion, and thus it is not possible to address the root cause of the congestion, that is, flow concentration. If a root cause flow is found, flow band control can be avoided through effective network utilization such as by performing path control. In addition, in the related art, all of flows passing through a congestion point are controlled, and it is not possible to perform control such as setting a used band in accordance with the type of flow. To perform more effective control, a flow that causes congestion has to be found. However, to check the flow quantity of the flows by using a switch, the switch has limited resources, and thus it is not possible to measure all of the flows and is difficult to determine a flow related to the congestion.

Figure 1:
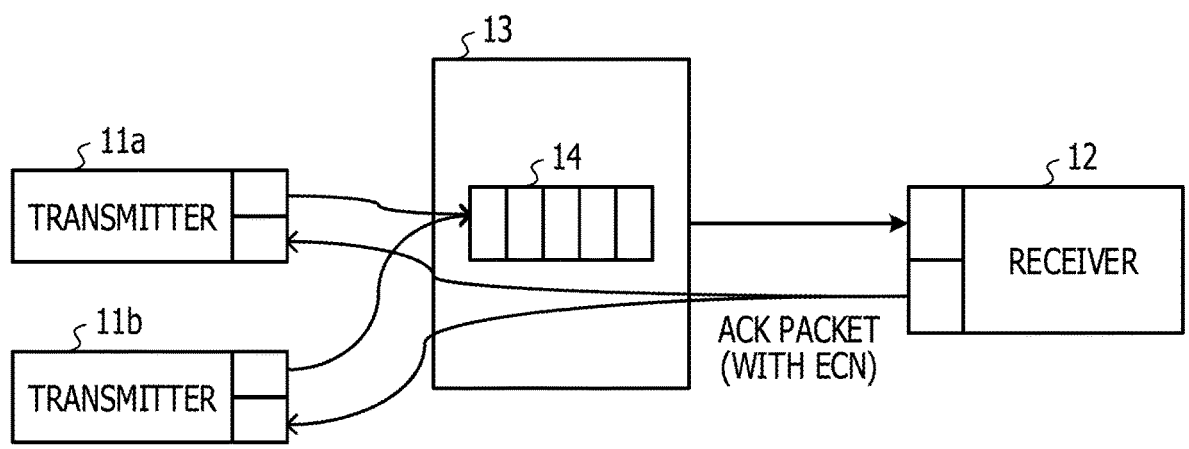
FIG. 1 is a diagram for explaining the outline of communication performed among devices via switches in an embodiment.

FIG. 1 is a diagram illustrating the outline of a communication network through which transmitters 11 (11a and 11b) and a receiver 12 perform communication via one of switches 13. As illustrated in FIG. 1, each of the transmitters 11 and the receiver 12 performs communication in such a manner as to transmit or receive a packet via the switch 13. The transmitters 11 and the receiver 12 are each, for example, a server as to be described later. Each transmitter 11 transmits a packet to the receiver 12. The transmitted packet is temporarily held in a queue 14 in the switch 13. At this time, the switch 13 monitors the length of the queue 14 (a queue length). If the queue length exceeds a threshold, the switch 13 adds an ECN mark to the packet based on a probability and transmits the packet to the receiver 12. The queue length is a total length of held packets.

Note that since the ECN is the related art, detailed description thereof is omitted. However, for example, reference to "The Addition of Explicit Congestion Notification (ECN) to IP Status of this Memo" may be made.

Figure 2A:
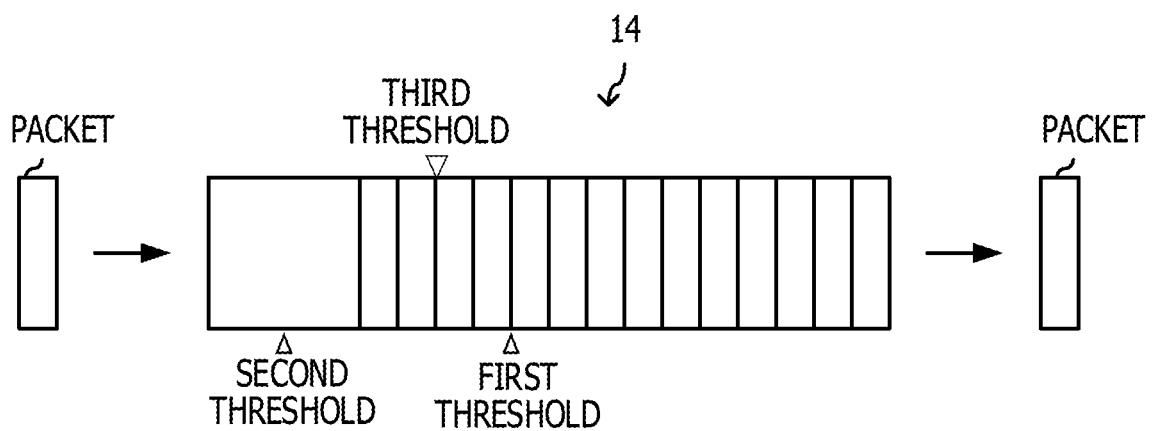
FIG. 2A is a diagram for explaining ECN mark addition in the embodiment.
Figure 2B:
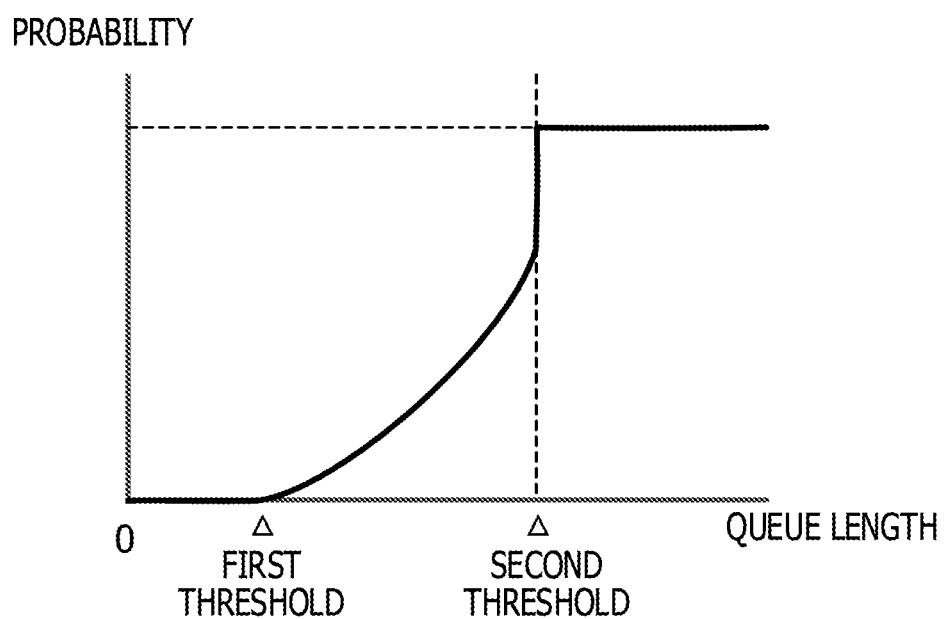
FIG. 2B is a graph for explaining the ECN mark addition in the embodiment.

An example of the ECN mark addition will be described by using FIGS. 2A and 2B. In this example, an ECN mark indicating congestion is added to a packet depending on a probability determined based on a relationship between the queue length and a threshold. As illustrated in FIG. 2A, received packets are held in the queue 14. This example illustrates a first threshold, a second threshold, and a third threshold. As illustrated in FIG. 2B, for example, if a queue length is in a range from 0 to the first threshold, an ECN mark addition probability is 0. If the queue length is in a range from the first threshold to the second threshold, as the ECN mark addition probability approaches the second threshold, the ECN mark addition probability raises in accordance with a predetermined function. If the queue length is greater than or equal to the second threshold, the ECN mark addition probability is 1. Note that the function for the ECN mark addition and an addition method are not limited to these, and other functions and methods may be used.

Note that the switch 13 may be configured to notify a processor to be described later in the switch 13 of information regarding the queue length when the queue length passes through (extends over) a threshold (for example, the third threshold) or every time a predetermined time period has elapsed since the previous update.

The notification (a queue-threshold passing notification) to the processor at this time is composed of items of port number and status as illustrated in FIG. 3. In the port number, the number of a port exhibiting threshold passing, that is, a port exhibiting an increase or decrease in queue length with respect to a predetermined threshold (for example, the third threshold) is described. In the status, whether congestion is detected is indicated. For example, a value of 0 or 1 is indicated as S1. The value of 0 indicates that the congestion is not detected, and the value of 1 indicates that the congestion is detected.

Upon receiving the queue-threshold passing notification, the processor records the content of the notification in a congestion information table and receiving time as a time item. The time is information used for deleting old information, and, for example, an entry having receiving time later than predetermined time is deleted.

Referring back to the description of FIG. 1, upon receiving the packet with the ECN mark, the receiver 12 adds the ECN mark to a response packet to the transmitter 11 (an ACK packet) and transmits the response packet. The transmitter 11 having received the packet with the ECN mark restricts a transmission rate. However, simply restricting the transmission rate does not enable flow concentration that is the root cause of the congestion to be addressed, and thus all of flows passing through the congestion point undergo band restriction. It is not possible to effectively utilize a network band.

It is conceivable that a congestion cause flow is determined in such a manner that the switch 13 checks the flow quantity of each flow. An existing switch has limited resources (for example, a memory), and it is not possible to measure all of the flows. For example, assume that IP address information of a virtual host is acquired through virtual system management and that the number of pieces of IP address information is N, that is, the number of end points is N. The number of conceivable communication pairs is $N^2$, and resources are not sufficient to set the switch for calculating communication quantity corresponding to the pairs. A typical switch has resources for pattern matching and counting capable of approximately 2K (2048) entries. In a case of $N^2=2048$, $N=45.2$ is obtained, which easily exceeds the number of the end points in a typical-scale virtual system. Note that the term "flow" is used to refer to a series of packets having the same pattern. The term "pattern" denotes a pattern of a field of a header.

An information processing system of each of embodiments described below acquires information regarding a flow that causes congestion in a network to effectively utilize the network band.

Figure 4:
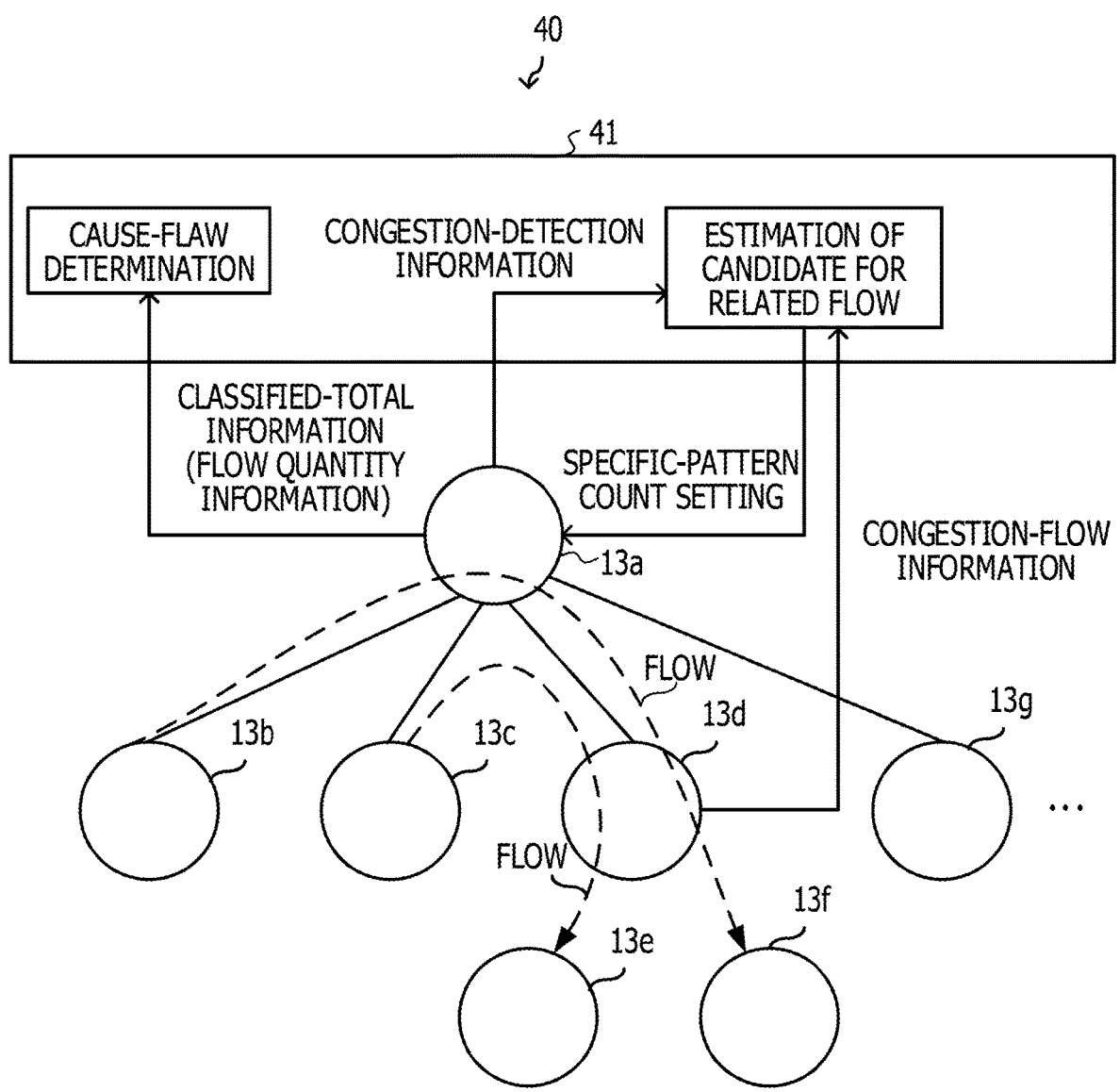
FIG. 4 is a configuration diagram illustrating an example of an information processing system of the embodiment.

FIG. 4 illustrates an example of the information processing system of an embodiment. An information processing system 40 includes a management apparatus (also referred to as an information processing apparatus) 41 and the switches 13 (13a to 13g). For easy-to-understand explanation, FIG. 4 illustrates only the switch 13a coupled to the management apparatus 41, but the other switches 13 are also coupled to the management apparatus 41.

Figure 5A:
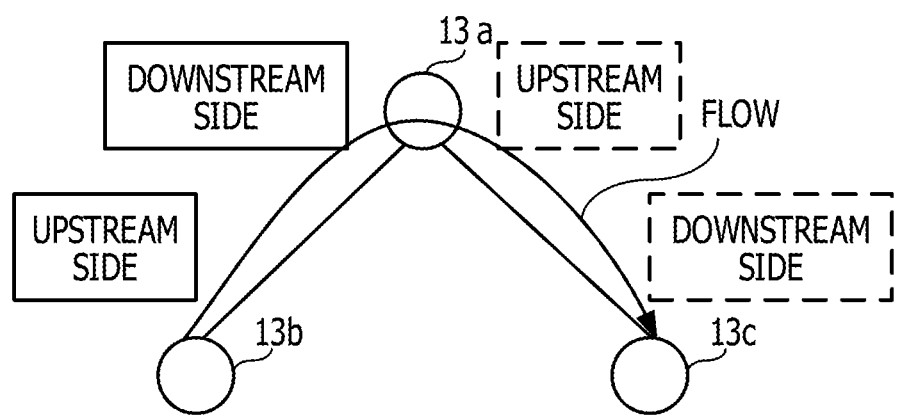
FIG. 5A is a diagram for explaining definition of the upstream side and the downstream side of a switch in the embodiment.

Although FIG. 4 illustrates the switch 13a as a switch upstream of the other switches 13 (13b to 13g), the switch 13a is not necessarily the upstream switch at any time. As illustrated in FIG. 5A, assume a case of flow from the switch 13b to the switch 13c via the switch 13a. In this case, the switch 13b is an upstream (solid line) switch on the flow source side with respect to the switch 13a, and the switch 13a is a downstream (solid line) switch with respect to the switch 13b. In contrast, the switch 13c is a downstream (broken line) switch on the flow destination side with respect to the switch 13a, and the switch 13a is an upstream (broken line) switch with respect to the switch 13c.

As described above, a switch serves as the upstream switch or the downstream switch, depending on the point of view. In other words, the switch 13a is the upstream switch or the downstream switch in a flow. In addition, if a switch has a plurality of flows, there is a possibility that the switch has a plurality of upstream sides and downstream sides of the respective flows.

Here, assume a case where a packet is transmitted in a flow, for example, from the switch 13b to the switch 13f via the switches 13a and 13d in the information processing system 40 in FIG. 4. If the switch 13a receives the flow, that is, the packet from the switch 13b, the switch 13a monitors the queue length. If the queue length exceeds the threshold (congestion occurs), the switch 13a adds an ECN mark to the packet based on the probability and transmits the packet to the switch 13f. At this time, the switch 13a transmits, to the management apparatus 41, congestion-detection information including information regarding the identifier of the switch 13a and the number of a port at which the congestion occurs.

In contrast, when the switch 13d downstream of the switch 13a receives the packet from the switch 13a, the switch 13d judges whether an ECN mark indicating the congestion is added to the packet. That is, if an ECN mark indicating congestion added based on the quantity of the received packet (queue length) and the predetermined thresholds (the first threshold to the third threshold) is present in the received packet, a switch thereby detects congestion.

If the ECN mark is detected, the switch 13d transmits flow information (such as a MAC header, an IP header, and a TCP/UDP port number) as congestion-flow information to the management apparatus 41. At this time, the switch 13d may transmit the packet to a central processor unit (CPU) in the switch 13d, cause the CPU to perform processing (redundant information removal), and thereafter transmit the packet to the management apparatus 41. The switch 13d may also transmit the packet to the management apparatus 41 without the processing by the CPU.

The management apparatus 41 receives the congestion-detection information from the switch 13a and receives the congestion-flow information from the switch 13d. The management apparatus 41 estimates at least one candidate for a related flow that is related to congestion based on the congestion-detection information and the congestion-flow information that are received and also based on network-topology information to be described later.

To determine a flow causing the congestion, the management apparatus 41 performs, on the switch 13a, a setting operation (specific-pattern count setting) for counting the number of flows (a packet count) that are each a candidate for a related flow and the quantity (a byte count), that is, pieces of information indicating the flow quantity.

The switch 13a having undergone the specific-pattern count setting counts the number of flows that are each the candidate for the related flow and the quantity, computes the classified total of the number of flows that are each the candidate for the related flow (a specific pattern) and the quantity in response to an acquisition request from the management apparatus 41, and transmits the classified-total information to the management apparatus 41.

The management apparatus 41 determines a congestion cause flow based on the received classified-total information. Note that if the congestion cause flow is found, the management apparatus 41 may execute a process for excluding the congestion cause (a process for such as changing the path of the cause flow or setting cause-flow band narrowing in an unillustrated host).

Here, the aforementioned congestion-detection information will be described by using FIG. 3; the flow information and the congestion-flow information, by using FIG. 5B; and the specific-pattern count setting and count information, by using FIG. 5C.

First, the congestion-detection information has items of switch ID, port number, status, and time. Switch ID is the identifier of a switch, port number is a port number at which congestion is detected, and status indicates whether the congestion is detected. For example, a value of 0 or 1 is indicated as S1. The value of 0 indicates that the congestion is not detected, and the value of 1 indicates that the congestion is detected. Time indicates time when the congestion is detected. Time is used for the following or the like. Comparison is performed between the time and time when the management apparatus 41 performs processing, and information having a time period difference exceeding a predetermined time period is ignored.

The flow information has items of destination MAC address (DA), source MAC address (SA), EtherType (ET), type of service (ToS), source IP address (SIP), destination IP address (DIP), protocol, source port (SP), and destination port (DP), and DA, SA, ET, ToS, SIP, DIP, SP, and DP are packet header information. Upon receiving a flow, the switch 13 records information regarding the received flow in a flow information table. If the same flow is received, the switch 13 counts the flow and records a count value as an item of count.

To transmit the congestion-flow information to the management apparatus 41, the content of the flow information table is transmitted as the congestion-flow information to the management apparatus 41. However, if there are a large number of entries, only flow information having the largest count value may be transmitted as the congestion-flow information.

DA is the MAC address of a transmission destination (destination), and SA is the MAC address of a transmission source. ET is the type of frame of Ethernet (registered trademark) such as IPv4. ToS is one of fields constituting a header of an IPv4 packet and indicates the type of communication service. ToS is herein used to indicate congestion, and, for example, ECN=1 indicating congestion is indicated.

SIP is the IP address of a transmission source, and DIP is the IP address of a transmission destination (destination). Protocol indicates the type of protocol and is, for example, TCP. SP is a transmission source port, and DP is a transmission destination (destination) port. Count indicates a value of the number of flows counted and accumulated when the same flow is received.

The specific-pattern count setting is requested from the management apparatus 41 and is performed to acquire the count information (packet count and byte count) regarding, for example, each flow illustrated in FIG. 5C. The set pattern and the identification number for identifying the pattern are registered in a pattern count table. The registering in association with the identification number enables the count information to be easily acquired in response to a specific-pattern count acquisition request including the identification number from the management apparatus 41.

The count information indicates the number of flows (packet count) for which the specific-pattern count is set and the quantity (byte count) as illustrated in FIG. 5C. In response to the specific-pattern count acquisition request from the management apparatus 41, the classified-total count information is transmitted to the management apparatus 41.

Hereinafter, specific details of processing will be described.

FIG. 6 illustrates an example configuration of the information processing system of an embodiment. Despite the illustration of a management network 61 and servers 62 that are not illustrated in the configuration in FIG. 4, basic processing is the same as that in the system illustrated in FIG. 4. An information processing system 60 includes the management apparatus 41, the switches 13 (13a and 13h to 13k), and the servers 62 (62a to 62h). The management port of each switch 13 is coupled to the management network 61 and thus coupled to the management apparatus 41. Each coupled server 62 under the corresponding switch 13 corresponds to one of the transmitters 11 or the receiver 12 that are described above. Note that network topology does not necessarily have to be tree topology and may be another topology (such as mesh topology). The management network 61 does not have to be provided separately, and a network formed by the switches 13 may be utilized.

Figure 7:
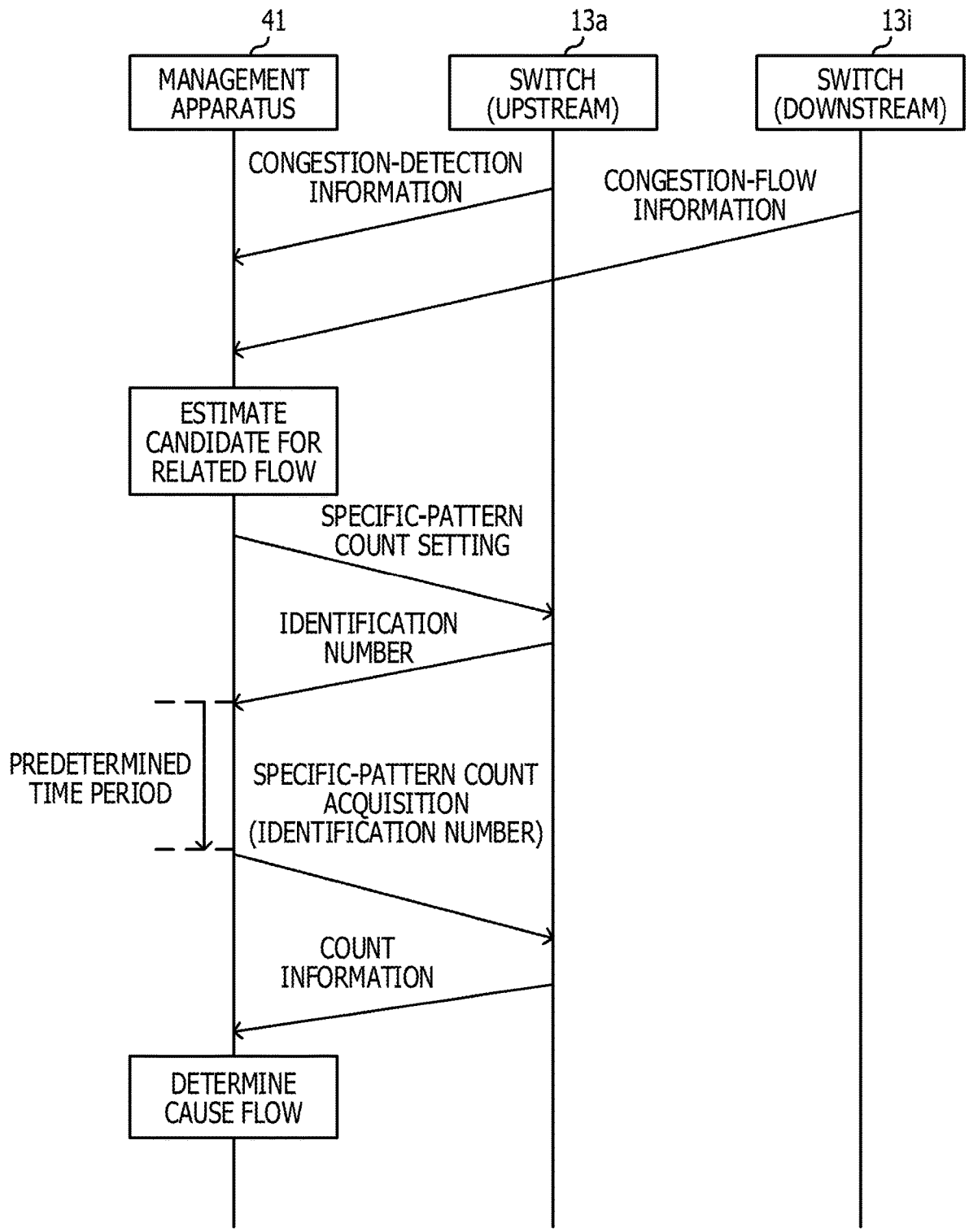
FIG. 7 is a sequence chart illustrating a process for estimating a related flow that is related to congestion and a process for determining a flow causing the congestion, the processes being executed in the information processing system of the embodiment.

Hereinafter, a process for estimating a related flow that is related to congestion in the information processing system 60 and a process for determining a congestion cause flow will be described by using a sequence chart illustrated in FIG. 7.

Assume a case of flow from a switch 13h to the switch 13i via the switch 13a. After the switch 13a receives a packet from the upstream switch 13h, the switch 13a monitors a queue length. If the queue length exceeds the threshold, the switch 13a adds an ECN mark to the packet based on the probability and transmits the packet with the ECN mark added thereto to the switch 13i. At this time, the switch 13a transmits congestion-detection information to the management apparatus 41.

The switch 13i that receives the packet from the switch 13a judges whether the ECN mark indicating congestion is added to the packet. If the ECN mark is detected, the switch 13i transmits the congestion-flow information to the management apparatus 41.

The management apparatus 41 that receives the congestion-detection information and the congestion-flow information estimates at least one candidate for a related flow that is related to congestion based on the congestion-detection information and the congestion-flow information that are received and the network-topology information indicating a port coupling relationship. Specifically, determining the port ID of a port coupled to a port having the number indicating the congestion occurrence in the switch 13a enables estimation of the candidate for the related flow that is related to the congestion. The network-topology information will be described later.

After estimating the related flow candidate, the management apparatus 41 performs the count setting operation (specific-pattern count setting) for counting the number of flows (packet count) that are each a candidate for a related flow and the quantity (byte count) on the switch 13a to determine a flow causing the congestion.

The switch 13a that receives the specific-pattern count setting not only starts counting the number of flows that are each the related flow candidate and the quantity but also transmits the identification number of the corresponding specific pattern to the management apparatus 41. The identification number is used to identify an acquisition target when the count information described later is acquired.

The management apparatus 41 waits until a predetermined time period elapses after receiving the identification number and transmits a specific-pattern count acquisition request including the received identification number to the switch 13a. The management apparatus 41 waits until the predetermined time period elapses because there is a case where even if the count information is acquired immediately after the specific-pattern count setting, nothing is counted depending on communication speed or the like in the network.

Upon receiving the specific-pattern count acquisition request, the switch 13a transmits, to the management apparatus 41, the count information regarding the specific pattern corresponding to the identification number.

The management apparatus 41 determines a congestion cause flow based on the received count information. For example, the management apparatus 41 considers that a flow with larger flow quantity in the received pieces of count information has a higher congestion-cause contribution ratio in the order from the flow with the largest flow quantity and determines at least one flow as the congestion cause flow. The determination method is not limited to this.

Figure 8:
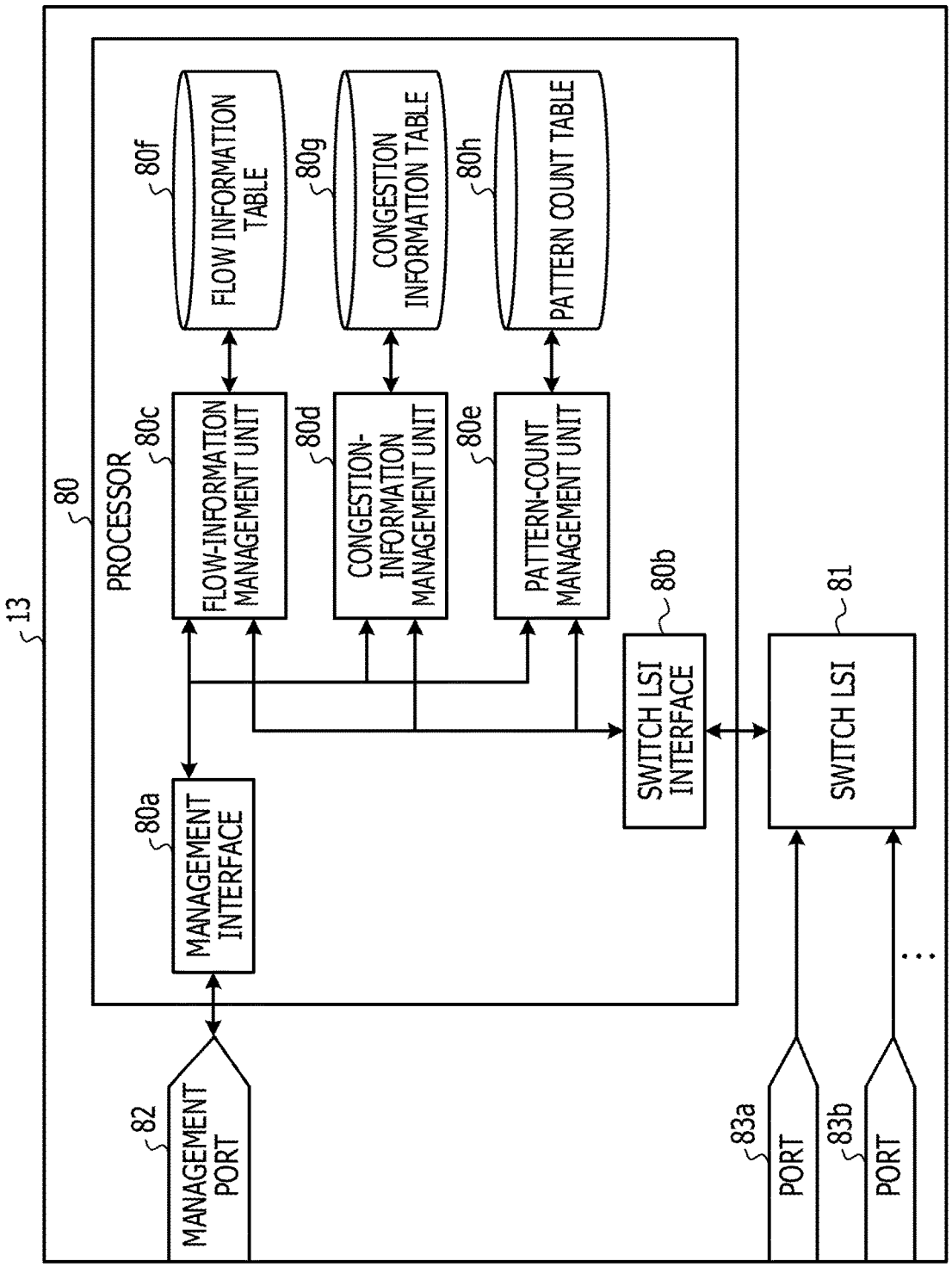
FIG. 8 is a diagram illustrating the configuration of a switch in each embodiment.

The configuration of a switch in each embodiment will be described by using FIG. 8. Note that the configuration of the switch is common to all of the switches.

Each switch 13 includes a processor 80, a switch LSI 81, a management port 82, and ports 83 (83a, 83b, . . . ). The management port 82 is a port coupled to the management apparatus 41, and each port 83 is a port coupled to one of the other switches 13 or the servers 62.

The processor 80 includes a management interface 80a and a switch LSI interface 80b. The management interface 80a is an interface through which data is transmitted and received to and from the management port 82. The switch LSI interface 80b is an interface through which data is transmitted and received to and from the switch LSI 81. The processor 80 runs a predetermined program and thereby implements the flow-information management function of a flow-information management unit 80c, the congestion-information management function of a congestion-information management unit 80d, and the pattern-count management function of a pattern-count management unit 80e that are described later, by using a flow information table 80f, a congestion information table 80g, and a pattern count table 80h.

Figure 9:
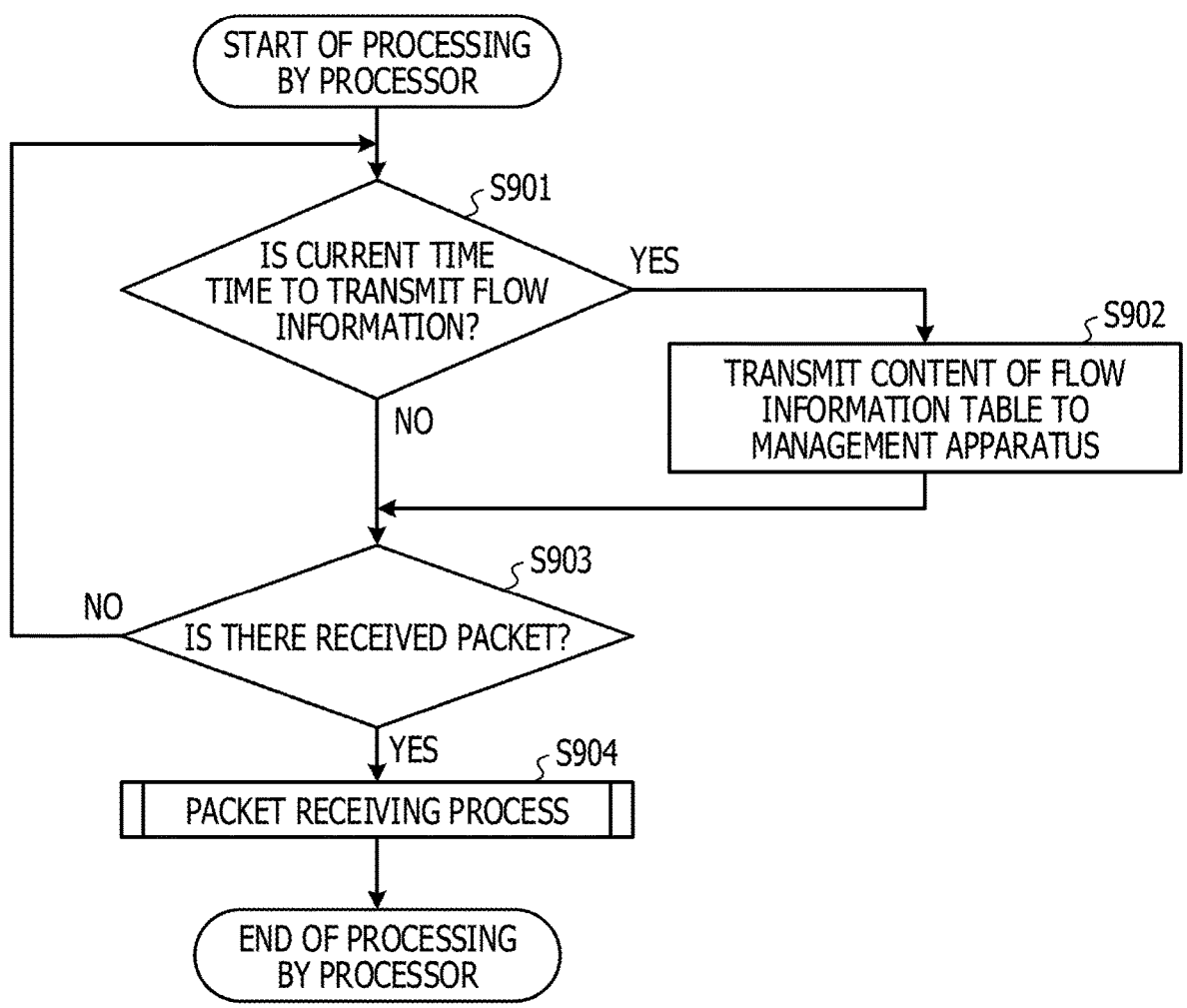
FIG. 9 is a flowchart illustrating processing by a processor of the switch in the embodiment.

Here, specific processing by the processor 80 will be described by using FIG. 9. The processor 80 judges whether the current time is time to transmit flow information (step S901). Specifically, the processor 80 judges whether a predetermined time period for the transmission time has elapsed. If the time period has elapsed, the processor 80 judges that the current time is the transmission time. To reduce processing load on the processor 80, the transmission is performed every time the predetermined time period elapses.

If it is judged that the current time is the transmission time (Yes in step S901), the processor 80 transmits the content of the flow information table 80f as congestion-flow information to the management apparatus 41 via the management port 82 (step S902). If the number of entries exceeds a predetermined maximum number of entries to be transmitted when the content of the flow information table 80f is transmitted to the management apparatus 41, at least one entry having a large counter value may be selected and the content of the selected entry in the flow information table 80f may be transmitted to the management apparatus 41. For example, if there are 1000 entries, transmitting the content of all of the entries to the management apparatus 41 leads to an increase in the load on the management apparatus 41. Accordingly, selecting at least one of the entries enables the load on the management apparatus 41 to be reduced.

In contrast, if it is judged that the current time is not the time to transmit the flow information (No in step S901), the processor 80 judges whether there is a received packet (step S903). If there is not a received packet (No in step S903), the process returns to step S901. In contrast, if there is a received packet (Yes in step S903), the processor 80 executes one of packet receiving processes (step S904).

Next, the aforementioned packet receiving processes by the processor 80 will be described.

Figure 10:
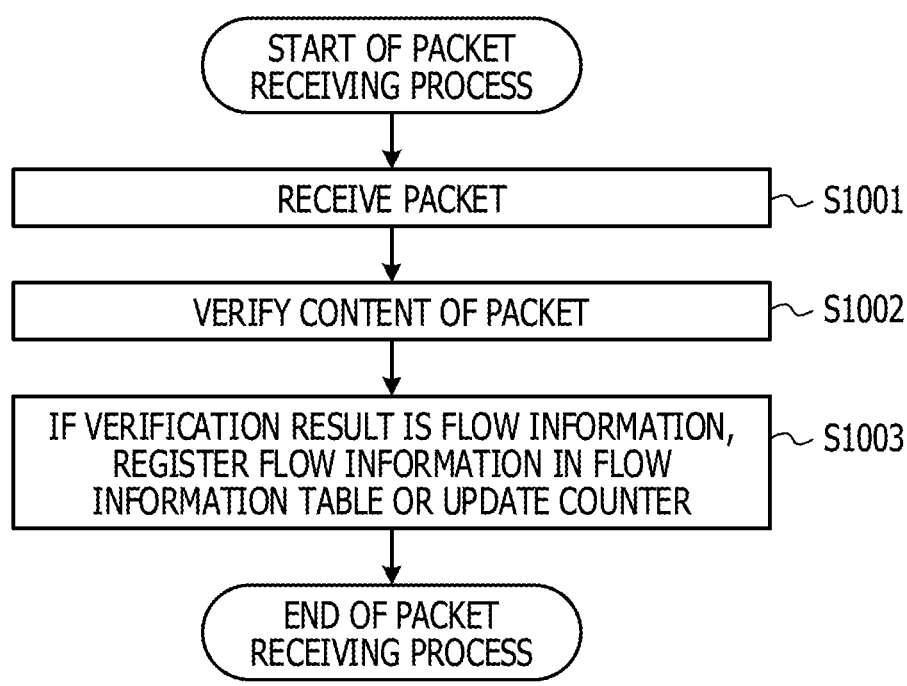
FIG. 10 is a flowchart illustrating a process executed when the flow information is received in the embodiment.

First, a receiving process executed when flow information is received will be described by using FIG. 10. The processor 80 receives a packet from the switch LSI 81 via the switch LSI interface 80*b* (step S1001). The processor 80 verifies the content of the received packet (step S1002). If the verification result is the flow information, the processor 80 registers the flow information in the flow information table 80*f* or updates the counter (step S1003).

Figure 11:
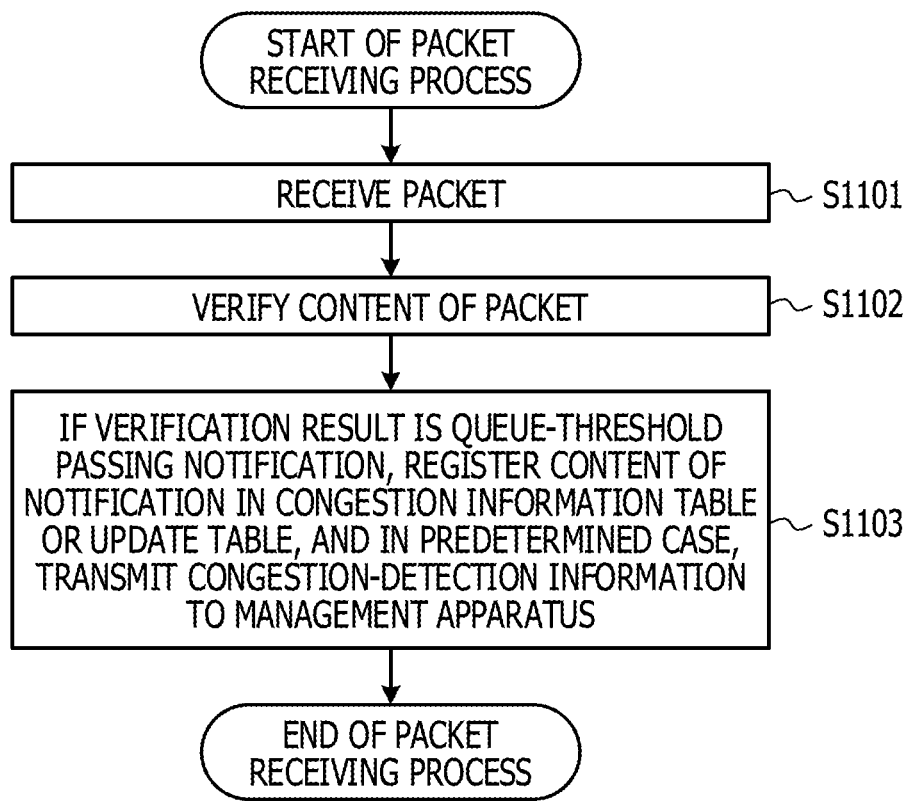
FIG. 11 is a flowchart illustrating a process executed when the queue-threshold passing notification is received in the embodiment.

Subsequently, a receiving process executed when a queue-threshold passing notification is received will be described by using FIG. 11. The processor 80 receives a packet from the switch LSI 81 via the switch LSI interface 80*b* (step S1101). The processor 80 verifies the content of the received packet (step S1102). If the verification result is the queue-threshold passing notification, the processor 80 registers the content of the notification in the congestion information table 80*g* or updates the congestion information table 80*g*, based on the queue-threshold passing notification (step S1103). Further, in a predetermined case, that is, in a case where a status changes (a status change) or where a predetermined time period has elapsed since the previous update time, the processor 80 transmits congestion-detection information to the management apparatus 41 via the management port 82 (step S1103).

Figure 12:
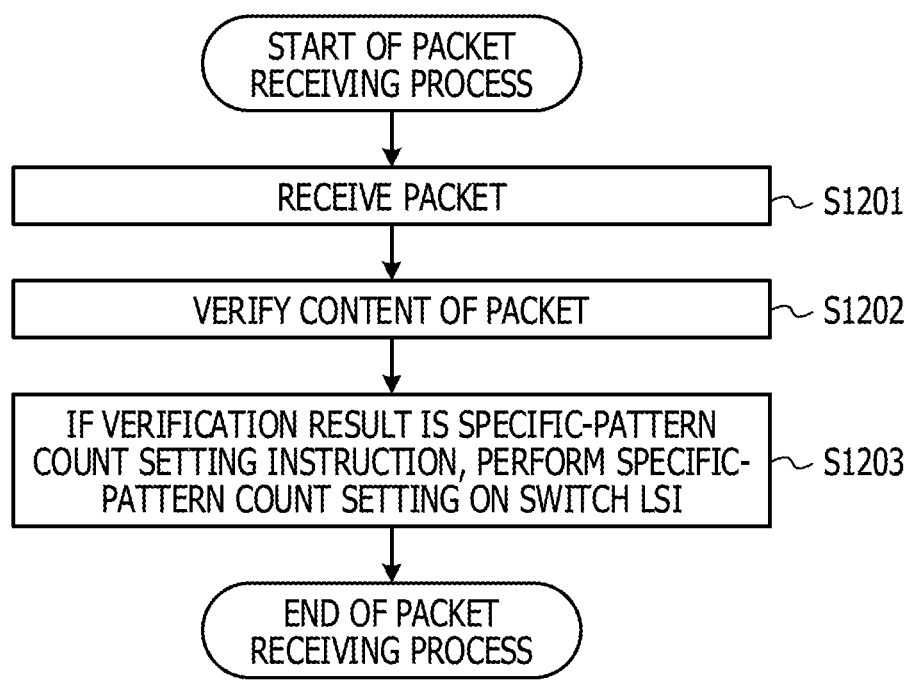
FIG. 12 is a flowchart illustrating a process executed when an instruction to set specific-pattern count is received in the embodiment.

Subsequently, a receiving process executed when an instruction to set the specific-pattern count is received will be described by using FIG. 12. The processor 80 receives a packet from the management apparatus 41 via the management port 82 (step S1201). The processor 80 verifies the content of the received packet (step S1202). If the verification result is the instruction to set the specific-pattern count, the processor 80 performs the specific-pattern count setting on the switch LSI 81 and causes the switch LSI 81 to compute the classified total of pieces of count information (step S1203).

Figure 13:
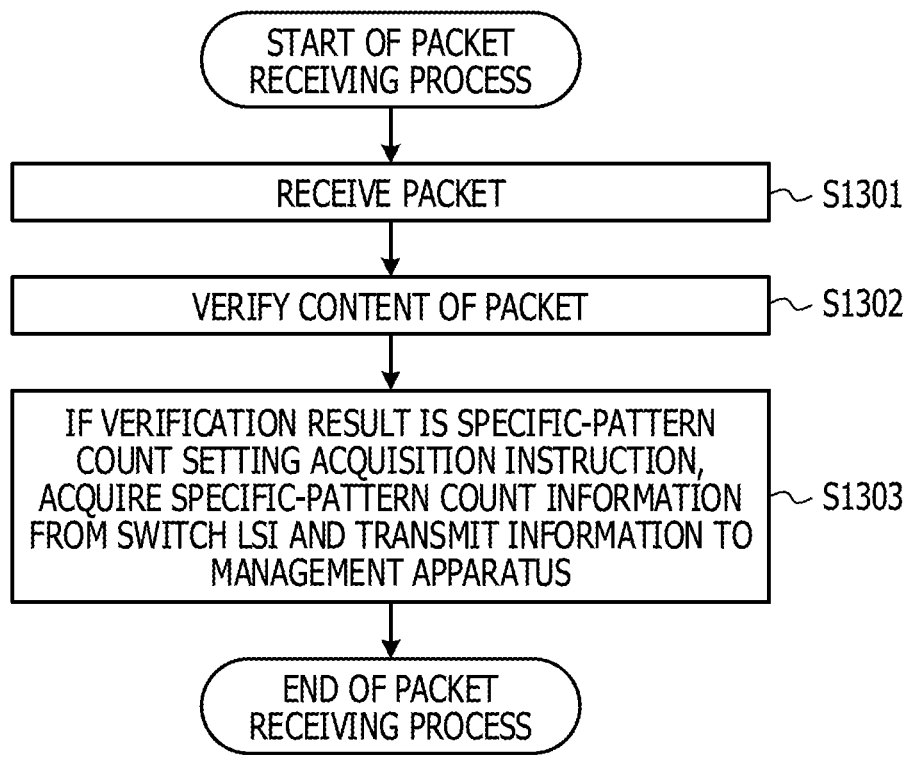
FIG. 13 is a flowchart illustrating a process executed when an instruction to acquire the specific-pattern count is received in the embodiment.

Subsequently, a receiving process executed when an instruction to acquire the specific-pattern count will be described by using FIG. 13. The processor 80 receives a packet from the management apparatus 41 via the management port 82 (step S1301). The processor 80 verifies the content of the received packet (step S1302). If the verification result is the instruction to acquire the specific-pattern count, the processor 80 acquires count information regarding the specific pattern from the switch LSI 81 and transmits the count information to the management apparatus 41 via the management port 82 (step S1303).

Referring back to the description of the switch 13, the switch LSI 81 transmits and receives data to and from the other switches 13 or the servers 62 via the port 83 and also transmits and receives data to and from the processor 80 via the switch LSI interface 80*b*. For example, the switch LSI 81 computes the classified total of the number of flows (packet count) and the quantity (byte count) in response to a request from the management apparatus 41.

Figure 14:
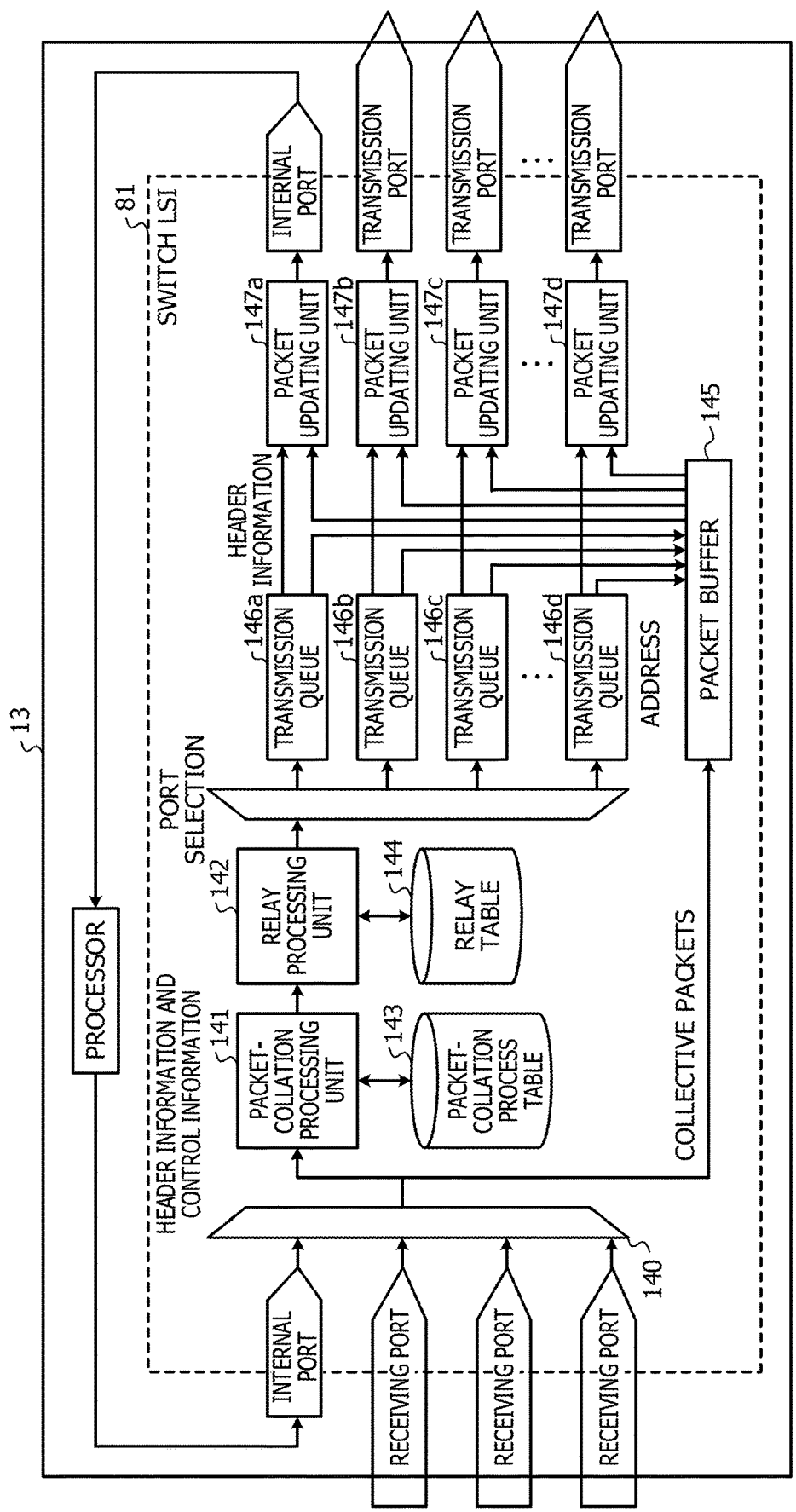
FIG. 14 is a diagram illustrating the configuration of a switch LSI of the switch in the embodiment.

The configuration of the switch LSI 81 will be described by using FIG. 14. The switch LSI 81 includes a multiplexer 140, a packet-collation processing unit 141, a relay processing unit 142, a packet-collation process table 143, a relay table 144, a packet buffer 145, transmission queues 146 (146*a*, 146*b*, . . . , and 146*n*), and packet updating units 147 (147*a*, 147*b*, . . . , and 147*n*). The switch LSI 81 runs predetermined programs and thereby implements the processing function of the multiplexer 140, the packet collation function of the packet-collation processing unit 141, the transmission port selection function of the relay processing unit 142, and the packet update and transmission function of each packet updating unit 147.

The multiplexer 140 processes, as packets to be output collectively, a plurality of input packets received from receiving ports. For example, the multiplexer 140 outputs the collective received packets to the packet buffer 145 and also outputs header information and control information of the packets to the packet-collation processing unit 141.

The packet-collation processing unit 141 collates the header information of each packet with information recorded in the packet-collation process table 143. If there is matching information, the packet-collation processing unit 141 performs an action (process) designated in the matching information. Examples of the action include transferring a packet to a designated port. The packet-collation processing unit 141 also performs recording, updating, computing the classified total, and the like of the count information.

The relay processing unit 142 checks the header information and selects a transmission port for transmitting the packet. At this time, the transmission port is selected based on the information in the relay table 144, that is, a table in which header information and a transmission port are associated with each other.

The packet-collation process table 143 has packet header information (match), action, and count information regarding the number of collated and matching packets and the size. The packet-collation process table 143 is, for example, a table as illustrated in FIG. 15. Description of the header information is omitted because the header information has the same content as the above-described content of the flow information. Note that * denotes a wildcard, that is, denotes matching any value.

Action has items of modification, transfer, and copy. Modification denotes modification of a packet header, transfer denotes transfer to a designated port, and copy denotes transmission of a copy of a packet to the processor 80.

The count information has items of packet count and byte count (size). Packet count denotes the number of collated and matching packets, and byte count denotes the size of at least one packet such as the total size of all of matching packets or the largest size.

The relay table 144 is the table in which header information and a transmission port are associated with each other.

The packet buffer 145 records therein the collective packets received from the receiving ports. When a transmission port for a packet is decided, the packet to be transmitted is read out.

Each transmission queue 146 temporarily stores therein packet information transmitted from the relay processing unit 142.

Each packet updating unit 147 takes out the packet information stored in the corresponding transmission queue 146 and reads out the corresponding collective packets from the packet buffer 145 and appropriately updates a corresponding one of the packets (such as adding an ECN mark) in accordance with the packet information. The packet updating unit 147 transmits the packet from the corresponding transmission port.

Processes by the switch LSI 81 will be described by using flowcharts.

Figure 16:
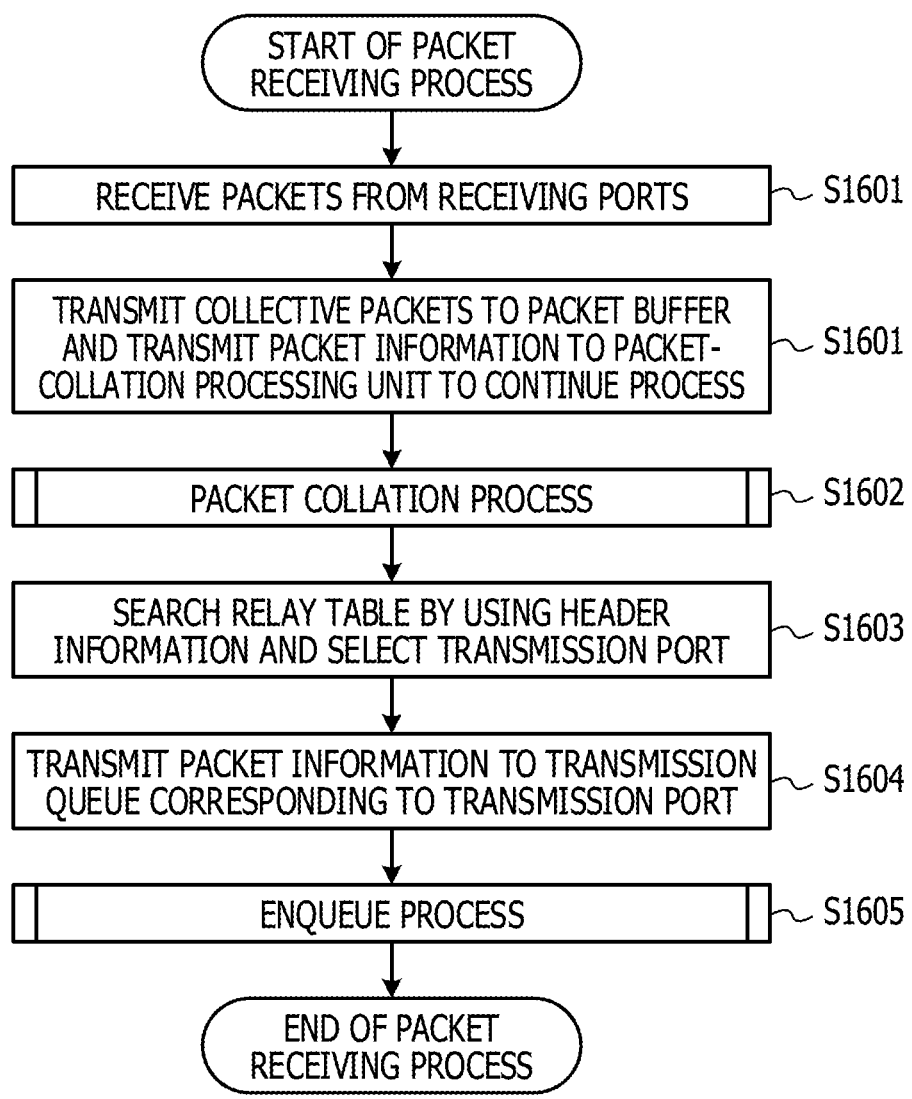
FIG. 16 is a flowchart illustrating a packet receiving process by the switch LSI in the embodiment.

First, a packet receiving process by the switch LSI 81 will be described by using FIG. 16. The multiplexer 140 receives packets from the receiving ports (step S1601). The multiplexer 140 transmits the collective received packets to the packet buffer 145 and also transmits the packet information (the header information and the control information) to the packet-collation processing unit 141 to continue the process (step S1602).

The packet-collation processing unit 141 executes a packet collation process (step S1603). Detailed processing will be described later. The relay processing unit 142 searches the relay table 144 by using the header information of each packet and selects a transmission port (step S1604). The relay processing unit 142 transmits the packet information to one of the transmission queues 146 that corresponds to the selected transmission port (step S1605). The transmission queue 146 executes an enqueue process (step S1606). The details of the enqueue process will be described later.

Figure 17:
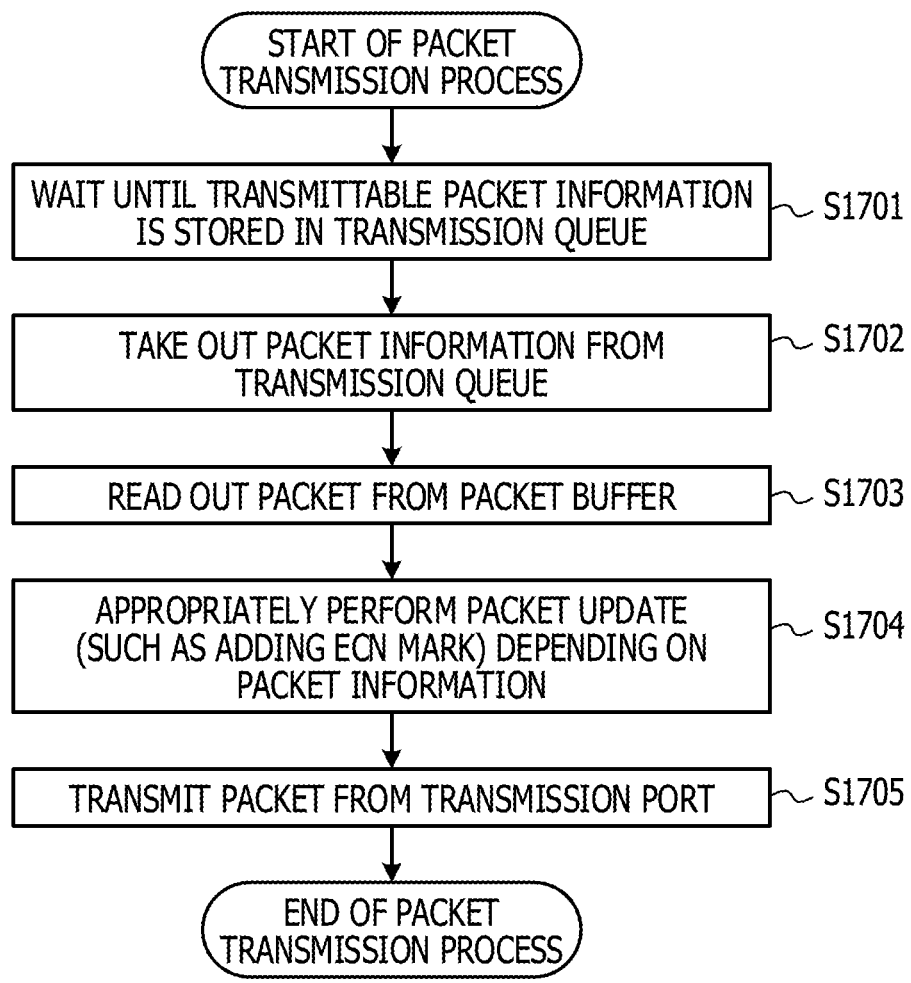
FIG. 17 is a flowchart illustrating a packet transmission process by the switch LSI in the embodiment.

Subsequently, a packet transmission process by the switch LSI 81 will be described by using FIG. 17. Each packet updating unit 147 waits until packet information regarding a transmittable packet is stored in the transmission queue 146 (step S1701). After the packet information regarding the transmittable packet is stored in the transmission queue 146, the packet updating unit 147 takes out the packet information from the transmission queue 146 (step S1702). The packet updating unit 147 reads out the packet from the packet buffer 145 (step S1703). The packet updating unit 147 appropriately performs an update of the packet (such as adding an ECN mark) depending on the packet information (step S1704). The packet updating unit 147 transmits the packet from the transmission port (step S1705).

Figure 18:
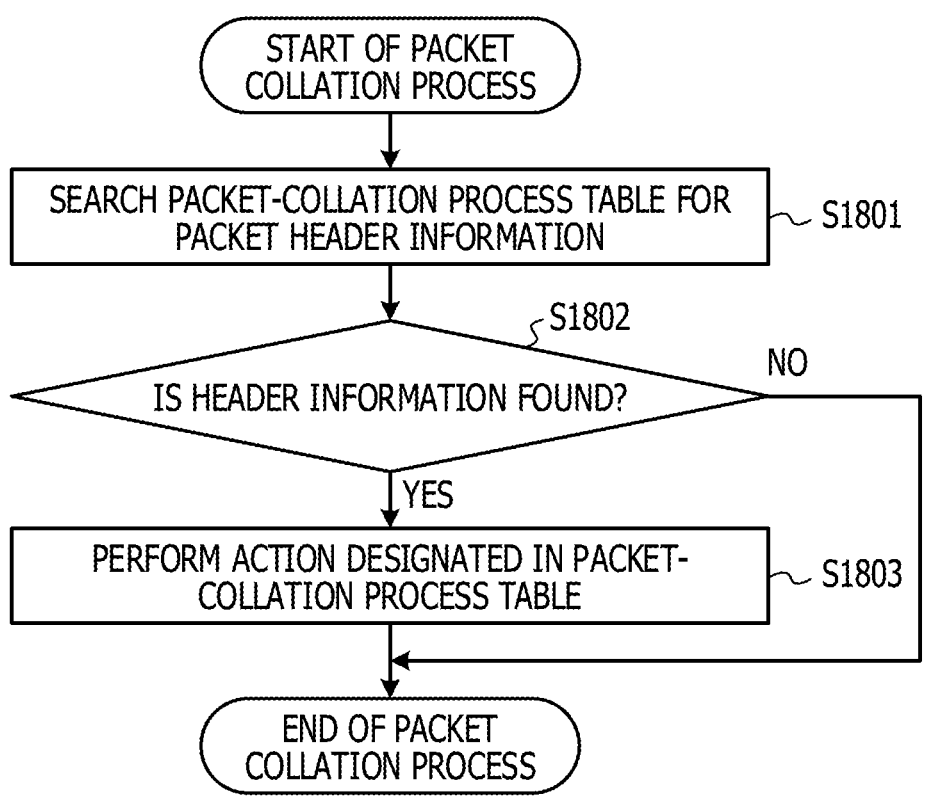
FIG. 18 is a flowchart illustrating a packet collation process by the switch LSI in the embodiment.

Subsequently, a packet collation process by the switch LSI 81 will be described by using FIG. 18. The packet-collation processing unit 141 searches the packet-collation process table 143 for the header information received from the multiplexer 140 (step S1801) and judges whether the header information is found (step S1802). If the header information is found (Yes in step S1802), the packet-collation processing unit 141 performs the action designated in the packet-collation process table 143 (step S1803). In contrast, if the header information is not found (No in step S1802), the packet collation process is terminated.

Figure 19:
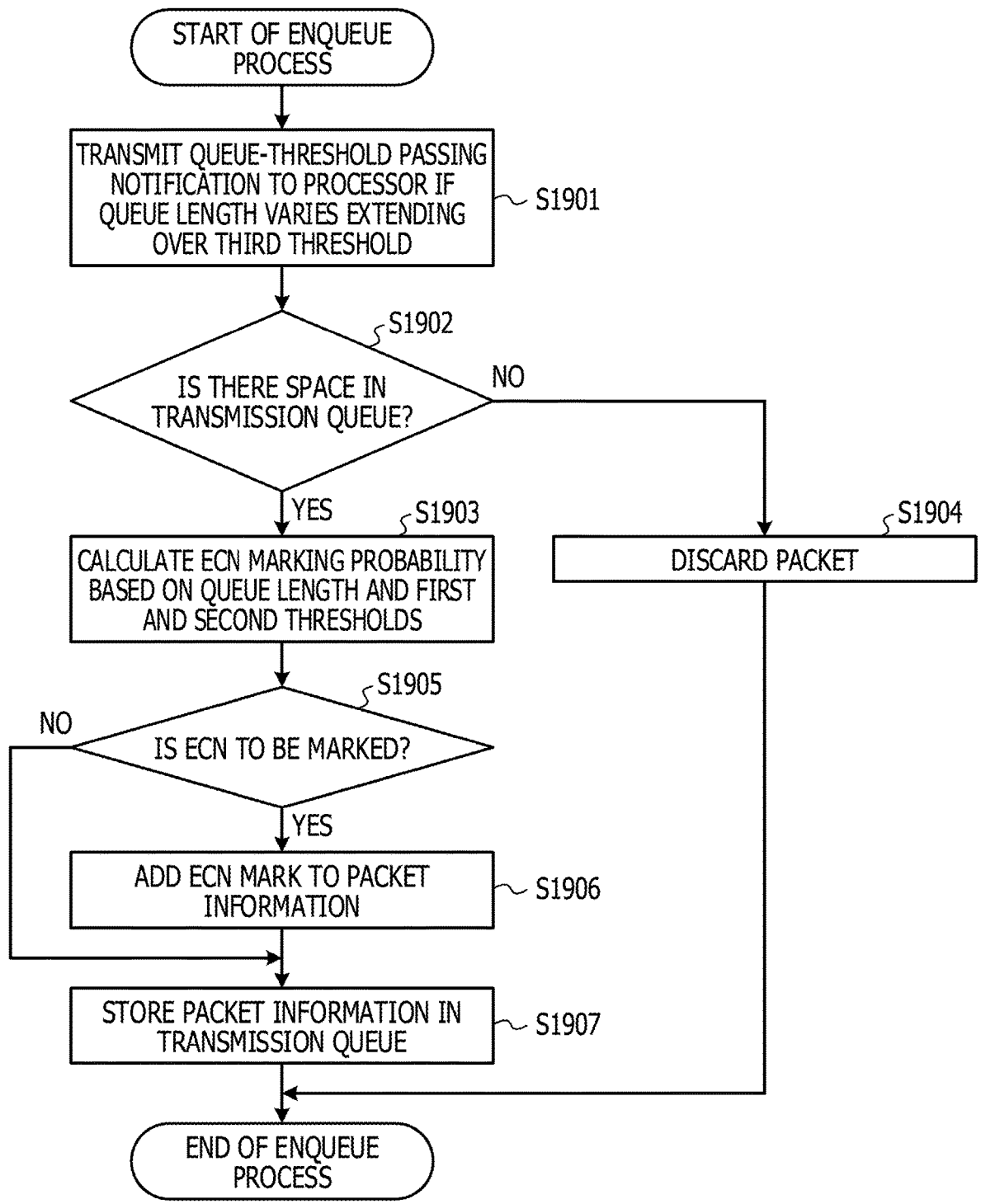
FIG. 19 is a flowchart illustrating an enqueue process by the switch LSI in the embodiment.

Subsequently, the enqueue process by the switch LSI 81 will be described by using FIG. 19. Although which component executes the enqueue process depends on the implementation of the switch LSI 81, for example, the transmission queue 146 herein executes the process. If the queue length varies extending over, for example, the third threshold at the time of enqueuing, a queue-threshold passing notification is transmitted to the processor 80 (step S1901). It is judged whether there is space in the transmission queue 146 (step S1902). If there is space in the transmission queue 146 (Yes in step S1902), a probability for marking an ECN is calculated based on the queue length, the first threshold, and the second threshold (step S1903). Specifically, the probability is calculated by using the function illustrated in FIG. 2B. In contrast, if there is no space in the transmission queue 146 (No in step S1902), it is not possible to transmit the packet, and thus the packet is discarded (step S1904). The enqueue process is terminated.

After the marking probability is calculated, it is judged whether to mark an ECN (step S1905). That is, it is decided whether to add the mark based on the calculated probability. If the ECN is to be marked (Yes in step S1905), the ECN mark is added to the packet information (step S1906), and the packet information is stored in the transmission queue 146 (step S1907). In contrast, if the ECN is not to be marked (No in step S1905), the process proceeds to step S1907.

Figure 20:
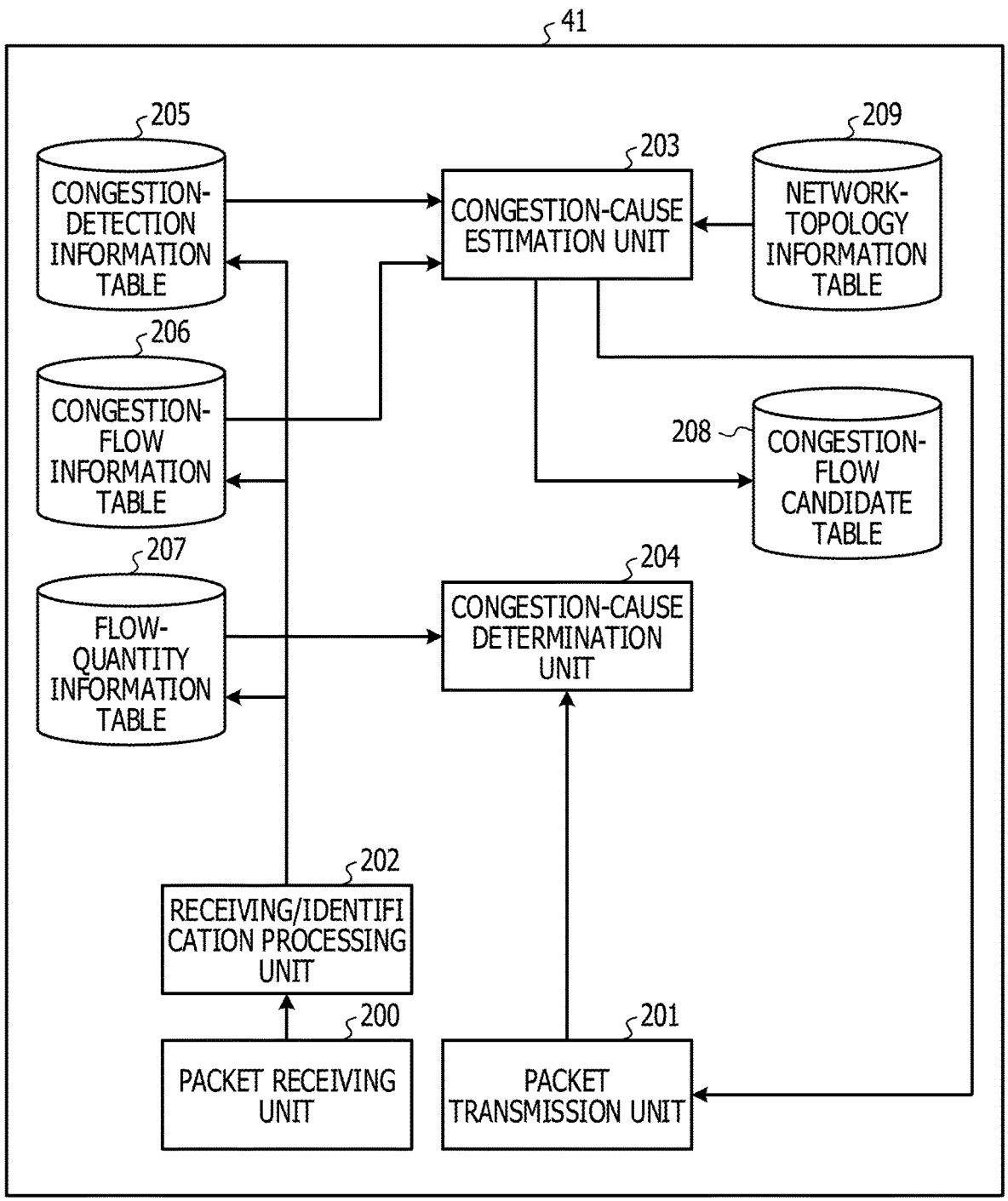
FIG. 20 is a configuration diagram illustrating the functional configuration of a management apparatus in each embodiment.

Subsequently, the functional configuration of a management apparatus in the embodiment will be described by using FIG. 20. The management apparatus 41 includes a packet receiving unit (also referred to as a receiving unit) 200, a packet transmission unit (also referred to as a transmitting unit) 201, a receiving/identification processing unit 202, a congestion-cause estimation unit (also referred to as an estimation unit) 203, a congestion-cause determination unit (also referred to as a determination unit) 204, a congestion-detection information table 205, a congestion-flow information table 206, a flow-quantity information table 207, a congestion-flow candidate table 208, and a network-topology information table 209.

The packet receiving unit 200 receives congestion-detection information, congestion-flow information, count information, and the like from the switch 13. The packet transmission unit 201 transmits an instruction to set specific-pattern count, a specific-pattern count acquisition request, and the like to the switch 13.

The receiving/identification processing unit 202 verifies the content of the received packet and records the information in the various tables in accordance with the content of the packet.

The congestion-cause estimation unit 203 estimates at least one candidate for a related flow that is related to congestion based on the congestion-detection information in the congestion-detection information table 205, the congestion-flow information in the congestion-flow information table 206, and network-topology information in the network-topology information table 209.

The congestion-cause determination unit 204 determines a congestion cause flow based on the number of flows (packet count) that are each a candidate for a related flow and the quantity (byte count), the number of flows and the quantity being recorded in the flow-quantity information table 207. Note that the congestion-cause determination unit 204 may display information regarding the determined congestion cause flow on an unillustrated display device or the like. As described above, the classified total of the number of flows (packet count) that are each a candidate for a related flow and the quantity (byte count) has been computed by the switch 13 based on the specific-pattern count setting.

The congestion-detection information table 205 is used to record the congestion-detection information transmitted from the switch 13.

The congestion-flow information table 206 is used to record the congestion-flow information transmitted from the switch 13.

The flow-quantity information table 207 is used to record the count information transmitted from the switch 13.

The congestion-flow candidate table 208 is used to record the candidate for the related flow that is related to congestion, the candidate being estimated by the congestion-cause estimation unit 203.

Figure 21:
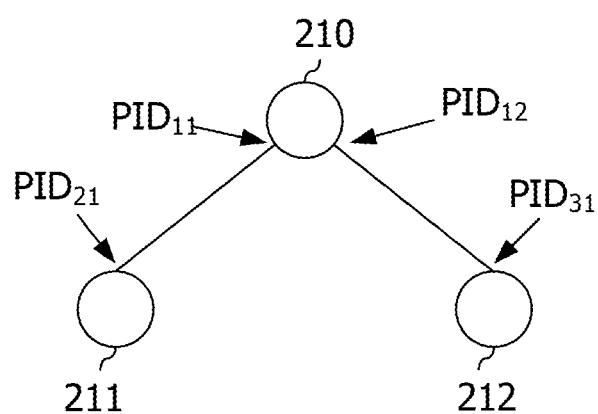
FIG. 21 is a diagram for explaining network-topology information in the embodiment.

The network-topology information table 209 is used to record network-topology information, that is, information indicating a port coupling relationship. For example, as in FIG. 21, coupling a port ID $(PID)_{11}$ and a $PID_{21}$ and coupling a $PID_{12}$ and a $PID_{31}$ are illustrated. Note that a pair of figures appended to PID is defined as a pair of, for example, a device ID and a port number. That is, the $PID_{11}$ indicates that a port number is 1 in a device 210 with a device ID of 1. The $PID_{21}$ indicates that a port number is 1 in a device 211 with a device ID of 2. The $PID_{31}$ indicates that a port number is 1 in a device 212 with a device ID of 3. Note that the use of the device ID, such as a switch ID, enables a network device to be uniquely identified.

Figure 22:
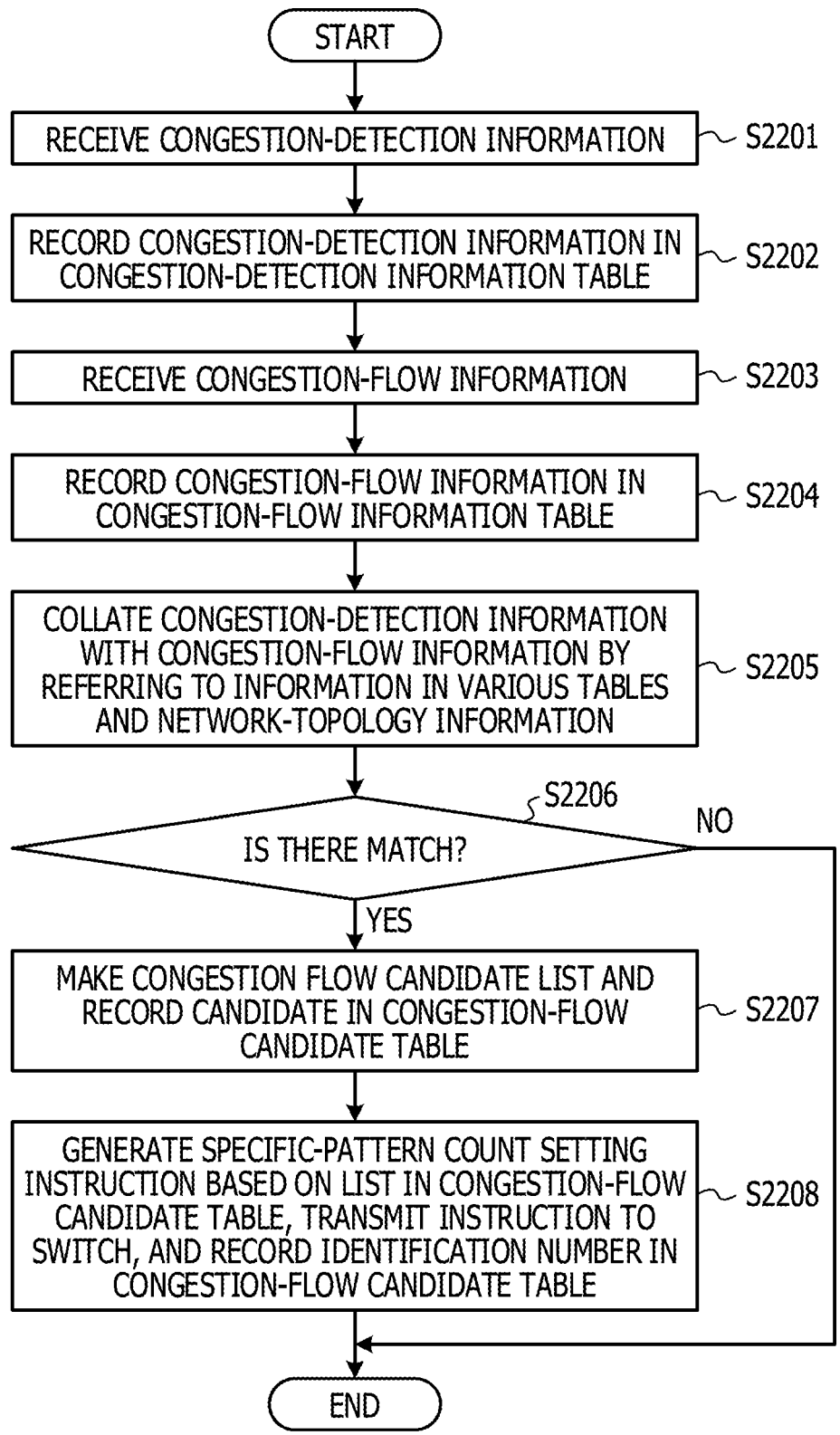
FIG. 22 is a flowchart illustrating a process for estimating a candidate for a related flow that is related to congestion and for transmitting an instruction to set the specific-pattern count, the process being executed by the management apparatus in the embodiment.

Subsequently, a process for estimating a candidate for a related flow that is related to congestion and for transmitting an instruction to set the specific-pattern count will be described by using FIG. 22, the process being executed by the management apparatus in the embodiment.

The management apparatus 41 receives congestion-detection information from one of the switches 13 (step S2201) and records the congestion-detection information in the congestion-detection information table 205 (step S2202). The management apparatus 41 also receives congestion-flow information from one of the switches 13 (step S2203) and records the congestion-flow information in the congestion-flow information table 206 (step S2204). Note that since the congestion-detection information and the congestion-flow information are received from the respective different switches 13, the order of the receiving step and the recording step differs depending on the case. For example, there is a case where the congestion-flow information is received before the congestion-detection information is recorded in the congestion-detection information table 205. Accordingly, the order of steps is not limited to that in this flowchart.

The management apparatus 41 collates the congestion-detection information with the congestion-flow information by referring to the congestion-detection information in the congestion-detection information table 205, the congestion-flow information in the congestion-flow information table 206, and the network-topology information in the network-topology information table 209 (step S2205). As a result of collation, the management apparatus 41 judges whether there is a match (step S2206).

If there is a match (Yes in step S2206), the management apparatus 41 makes a list of at least one congestion flow candidate and records the congestion flow candidate in the congestion-flow candidate table 208 (step S2207). That is, a candidate for a related flow that is related to congestion is estimated. If there is not a match (No in step S2206), the processing is terminated.

The management apparatus 41 generates an instruction to set the specific-pattern count based on the list in the congestion-flow candidate table 208, transmits the instruction to a target switch 13, and records the identification number of a specific pattern received from the target switch 13 in the congestion-flow candidate table 208 (step S2208).

Figure 23:
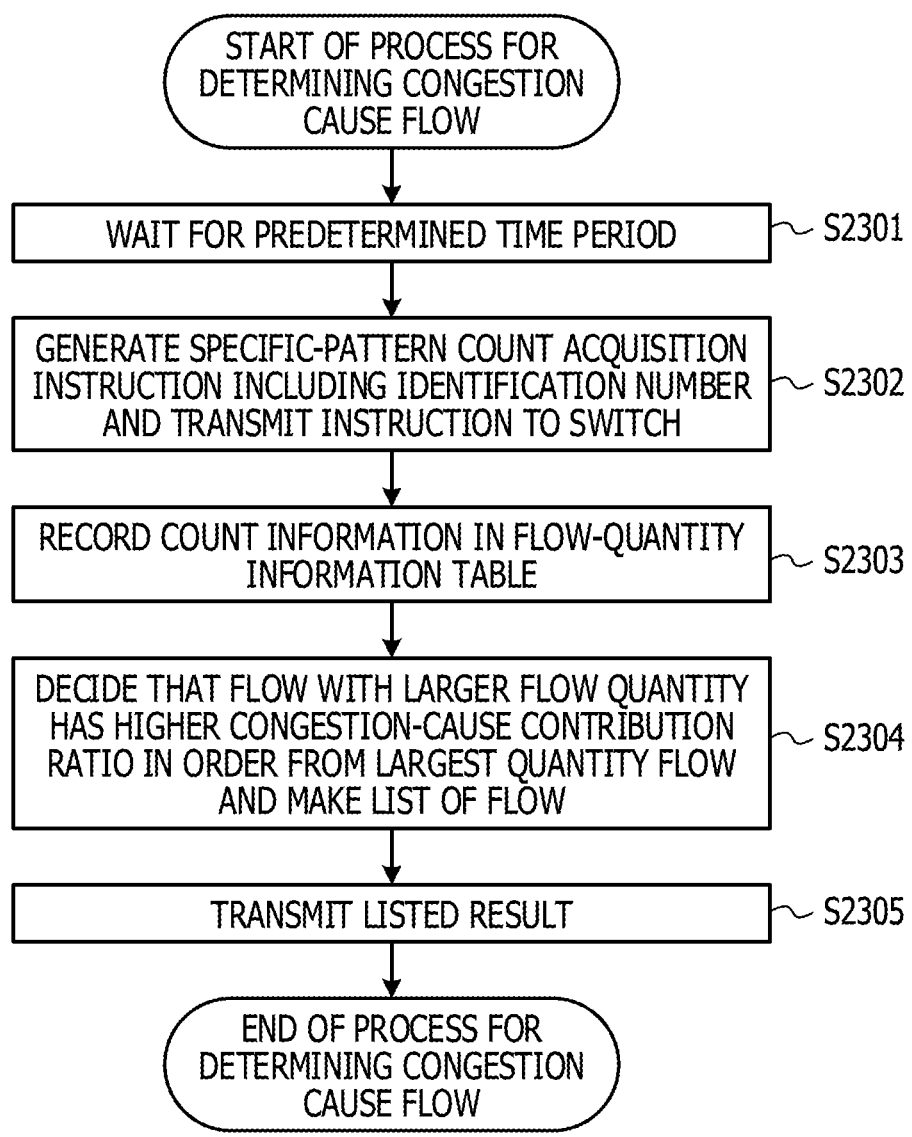
FIG. 23 is a flowchart illustrating the process for determining a congestion cause flow by the management apparatus in the embodiment.

Subsequently, the process for determining a congestion cause flow by the management apparatus in the embodiment will be described by using FIG. 23. After receiving the identification number from the switch 13, the management apparatus 41 waits for the predetermined time period (step S2301). The management apparatus 41 generates an instruction to acquire the specific-pattern count including the identification number recorded in the congestion-flow candidate table 208 and transmits the instruction to the target switch 13 (step S2302). The management apparatus 41 waits for a reply from the target switch 13 and records the received count information in the flow-quantity information table 207 (step S2303).

The management apparatus 41 scans the flow-quantity information table 207, decides that a flow with larger flow quantity has a higher congestion-cause contribution ratio in the order from the flow with the largest flow quantity, and makes a list of at least one decided flow (step S2304). Note that the list is herein made based on the flow with the largest flow quantity, but listing is not limited to this. The management apparatus 41 transmits the listed result to the unillustrated display device or an unillustrated overall management apparatus that performs overall management on external devices (step S2305). Note that the processing in step S2305 does not have to be necessarily performed.

Figure 24:
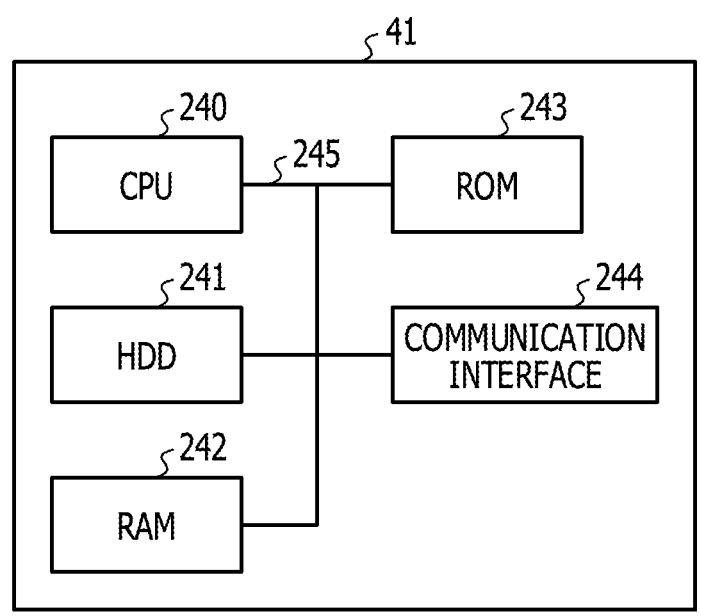
FIG. 24 is a diagram illustrating the hardware configuration of the management apparatus in the embodiment.

Subsequently, the hardware configuration of the management apparatus in the embodiment will be described by using FIG. 24. The management apparatus 41 includes, as hardware, a CPU 240, a hard disk drive (HDD) 241, a random access memory (RAM) 242, a read only memory (ROM) 243, a communication interface 244, and a bus 245. The CPU 240, the HDD 241, the RAM 242, the ROM 243, and the communication interface 244 are coupled to each other via, for example, the bus 245.

The CPU 240 reads a program stored in the HDD 241 or the like via the bus 245, the program being for a corresponding one of various processes (such as the process for estimating a candidate for a related flow that is related to congestion or the process for determining a congestion cause flow). The CPU 240 temporarily stores the read program in the RAM 242 and executes the corresponding one of the various processes in accordance with the program. The CPU 240 runs the programs and thereby mainly implements the functions of the receiving/identification processing unit 202, the congestion-cause estimation unit 203, and the congestion-cause determination unit 204 that are described above.

The HDD 241 stores therein application programs for executing various processes by the management apparatus 41, data to be used for the processes by the management apparatus 41, and the like. The HDD 241 mainly stores therein information in the congestion-detection information table 205, the congestion-flow information table 206, the flow-quantity information table 207, the congestion-flow candidate table 208, and the network-topology information table 209.

The RAM 242 is a volatile memory and temporarily stores therein an operating system (OS) program and some of the application programs that are to be run by the CPU 240. The RAM 242 also stores various pieces of data to be used for processing by the CPU 240.

The ROM 243 is a non-volatile memory and stores therein programs such as a boot program and basic input/output system (BIOS).

The communication interface 244 transmits and receives data to and from external devices (such as the switches) via the network.

The bus 245 is a path through which a control signal, a data signal, and the like are delivered between various devices.

According to an aspect of the information processing system of each embodiment, information regarding a flow that causes congestion in a network can be acquired. To observe all of flows in a case where the number of hosts is N, $N^2$ flows have to be observed. In contrast, in the embodiment, for example, in a case where ten flows highly related to congestion are estimated (determined), only resources for ten flows are to be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus configured to detect congestion caused by a plurality of flows passing through a network, the network including a plurality of switch devices, the information processing apparatus comprising:
a memory; and
a processor coupled to the memory and executes a process of:
receiving first information from a first switch device included in the plurality of switch devices, the first information indicating that the congestion occurs in the first switch device;
receiving second information from a second switch device that is included in the plurality of switch devices and receives a packet from the first switch device, the second information indicating at least one flow included in the plurality of flows which pass through the first switch device;
based on the first information and the second information, identifying, from the at least one flow which passes through the first switch device, a specific flow which causes the congestion;
transmitting a first instruction to the first switch device, the first instruction instructing to determine flow quantity of the specific flow;
acquiring, from the first switch device, fourth information indicating the flow quantity determined by the first switch device in response to the first instruction; and
when the specific flow includes two or more flows, determining a first flow included in the specific flow based on the fourth information.

2. The information processing apparatus according to claim 1, wherein
each of the plurality of switch devices includes a plurality of ports, and
the process further includes:
obtaining third information indicating a port coupling relationship among the plurality of switch devices; and
based on the third information, determining the specific flow.

3. The information processing apparatus according to claim 2, wherein the process further includes:
managing the plurality of switch devices including a first switch device that communicates with a second switch device without passing through the information processing apparatus.

4. The information processing apparatus according to claim 3, wherein the process further includes transmitting a second instruction to the first switch device after a first time period has elapsed after transmitting the first instruction to the first switch device, the second instruction instructing to transmit the flow quantity information to the information processing apparatus.

5. The information processing apparatus according to claim 3, wherein
the first switch device includes a queue that stores the packet included in the plurality of flows, and
when a number of the packet stored in the queue exceeds a certain value, the first switch device generates the first information.

6. A method executed by an information processing apparatus configured to detect congestion caused by a plurality of flows passing through a network, the network including a plurality of switch devices, the method comprising:
receiving first information from a first switch device included in the plurality of switch devices, the first information indicating that the congestion occurs in the first switch device;
receiving second information from a second switch device that is included in the plurality of switch devices and receives a packet from the first switch device, the second information indicating at least one flow included in the plurality of flows which pass through the first switch device;
based on the first information and the second information, identifying, from the at least one flow which passes through the first switch device, a specific flow which causes the congestion;
transmitting a first instruction to the first switch device, the first instruction instructing to determine flow quantity of the specific flow;
acquiring, from the first switch device, fourth information indicating the flow quantity determined by the first switch device in response to the first instruction; and
when the specific flow includes two or more flows, determining a first flow included in the specific flow based on the fourth information.

7. The method according to claim 6, wherein
each of the plurality of switch devices includes a plurality of ports, and
the method further comprises:
obtaining third information indicating a port coupling relationship among the plurality of switch devices; and
based on the third information, determining the specific flow.

8. The method according to claim 7, further comprising:
managing the plurality of switch devices including a first switch device that communicates with a second switch device without passing through the information processing apparatus.

9. The method according to claim 8, further comprising:
transmitting a second instruction to the first switch device after a first time period has elapsed after transmitting the first instruction to the first switch device, the second instruction instructing to transmit the flow quantity information to the information processing apparatus.

10. The method according to claim 8, wherein
the first switch device includes a queue that stores the packet included in the plurality of flows, and
when a number of the packet stored in the queue exceeds a certain value, the first switch device generates the first information.

11. A non-transitory computer-readable storage medium storing a program that causes an information processing apparatus to execute a process, the information processing apparatus being configured to detect congestion caused by a plurality of flows passing through a network, the network including a plurality of switch devices, the process comprising:
receiving first information from a first switch device included in the plurality of switch devices, the first information indicating that the congestion occurs in the first switch device;
receiving second information from a second switch device that is included in the plurality of switch devices and receives a packet from the first switch device, the second information indicating at least one flow included in the plurality of flows which pass through the first switch device;

based on the first information and the second information, identifying, from the at least one flow which passes through the first switch device, a specific flow which causes the congestion;

transmitting a first instruction to the first switch device, the first instruction instructing to determine flow quantity of the specific flow;

acquiring, from the first switch device, fourth information indicating the flow quantity determined by the first switch device in response to the first instruction; and when the specific flow includes two or more flows, determining a first flow included in the specific flow based on the fourth information.

12. The non-transitory computer-readable storage medium according to claim 11, wherein
each of the plurality of switch devices includes a plurality of ports, and
the process further comprises:
obtaining third information indicating a port coupling relationship among the plurality of switch devices; and
based on the third information, determining the specific flow.

13. The non-transitory computer-readable storage medium according to claim 12, the process further comprising:
managing the plurality of switch devices including a first switch device that communicates with a second switch device without passing through the information processing apparatus.

14. The non-transitory computer-readable storage medium according to claim 13, the process further comprising:
transmitting a second instruction to the first switch device after a first time period has elapsed after transmitting the first instruction to the first switch device, the second instruction instructing to transmit the flow quantity information to the information processing apparatus.

15. The non-transitory computer-readable storage medium according to claim 13, wherein
the first switch device includes a queue that stores the packet included in the plurality of flows, and
when a number of the packet stored in the queue exceeds a certain value, the first switch device generates the first information.

* * * * *